(12) United States Patent
Mizobe

(10) Patent No.: US 6,309,448 B1
(45) Date of Patent: Oct. 30, 2001

(54) VAPOR MOVEMENT CONTROLLING DEVICE

(76) Inventor: Kunitaka Mizobe, 6-7, Hoshiguma 1-chome, Jyonan-ku, Fukuoka-shi, Fukuoka 814-0132 (JP)

( * ) Notice: Subject to any disclaimer, the term of this patent is extended or adjusted under 35 U.S.C. 154(b) by 0 days.

(21) Appl. No.: 09/486,448

(22) PCT Filed: Jun. 24, 1999

(86) PCT No.: PCT/JP99/03382

§ 371 Date: Mar. 22, 2000

§ 102(e) Date: Mar. 22, 2000

(87) PCT Pub. No.: WO99/67009

PCT Pub. Date: Dec. 29, 1999

(30) Foreign Application Priority Data

Jun. 24, 1998 (JP) .................................................. 10-194953

(51) Int. Cl.⁷ ............................. B01D 53/22; B01D 53/26
(52) U.S. Cl. ....................................... 96/7; 96/9; 55/467.1
(58) Field of Search ............................... 96/4, 7, 8, 9, 10, 96/11, 221; 95/52; 55/467.1; 62/3.4, 3.7

(56) References Cited

U.S. PATENT DOCUMENTS

| | | | |
|---|---|---|---|
| 4,572,007 | * | 2/1986 | Postma . |
| 4,670,145 | * | 6/1987 | Edwards ..................................... 96/8 |
| 5,448,891 | * | 9/1995 | Nakagiri et al. .......................... 62/3.4 |
| 5,665,146 | * | 9/1997 | Mizobe ...................................... 96/7 |
| 5,827,424 | * | 10/1998 | Gillis et al. ........................... 210/180 |
| 5,985,005 | * | 11/1999 | Mizobe ...................................... 96/7 |
| 6,036,746 | * | 3/2000 | Scovazzo et al. ........................ 95/52 |
| 6,059,862 | * | 5/2000 | Mizobe et al. .............................. 96/7 |

FOREIGN PATENT DOCUMENTS

| | | |
|---|---|---|
| 7-68124 | 3/1995 | (JP) . |
| 8-323132 | 12/1996 | (JP) . |
| 8-327101 | 12/1996 | (JP) . |
| 9-57044 | 3/1997 | (JP) . |
| 10-192640 | 7/1998 | (JP) . |
| 10-246475 | 9/1998 | (JP) . |
| 10-290916 | 11/1998 | (JP) . |

OTHER PUBLICATIONS

Mitzobe et al. "Long term filed test of humidity controller with membranes," National Convention of the Institute of Electrical Engineers, Japan. Mar. 1999.

Mitzobe et al. "Basic characteristics of humidity controller with membranes for switch box," National Convention of the Institute of Electrical Engineers, Japan. Mar. 1999.

* cited by examiner

Primary Examiner—David A. Simmons
Assistant Examiner—Frank M. Lawrence
(74) Attorney, Agent, or Firm—Merchant & Gould P.C.

(57) ABSTRACT

A water vapor movement control apparatus that provides a directional property to movement of water vapor between two spaces with different humidity levels, is provided with an insulated channel connecting the first space with the second space, a plurality of chambers formed in the channel by a plurality of moisture-permeable membranes which are waterproof and air permeable, and a Peltier element that creates a temperature gradient so that the air in the chambers is always at lower temperature toward the second space end, wherein the middle moisture-permeable membrane among the plurality of moisture-permeable membranes forms an approximately conical shape, and the parameter (moisture permeability)×(air permeability) of each of the plurality of moisture-permeable membranes decreases for the moisture-permeable membranes toward the second space end, so that water vapor in the first space is moved into the second space.

6 Claims, 25 Drawing Sheets

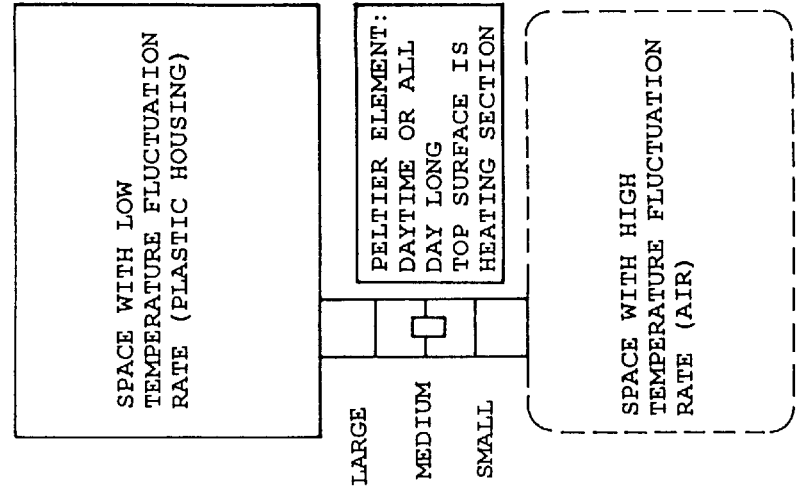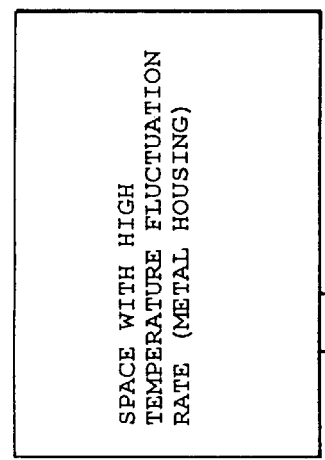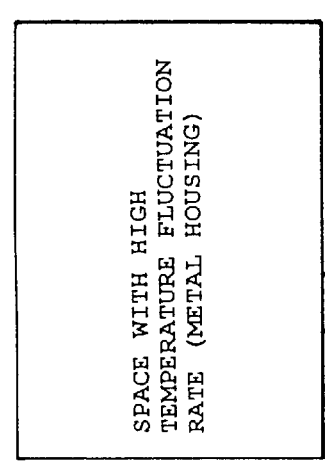

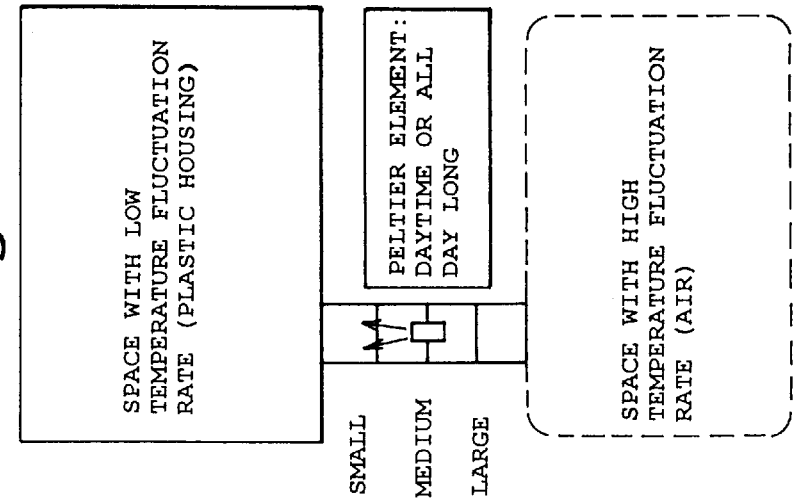
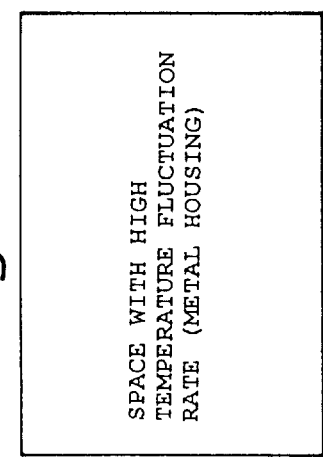
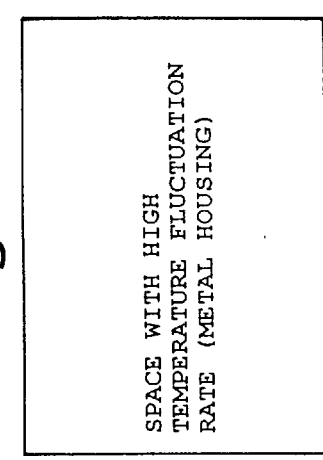

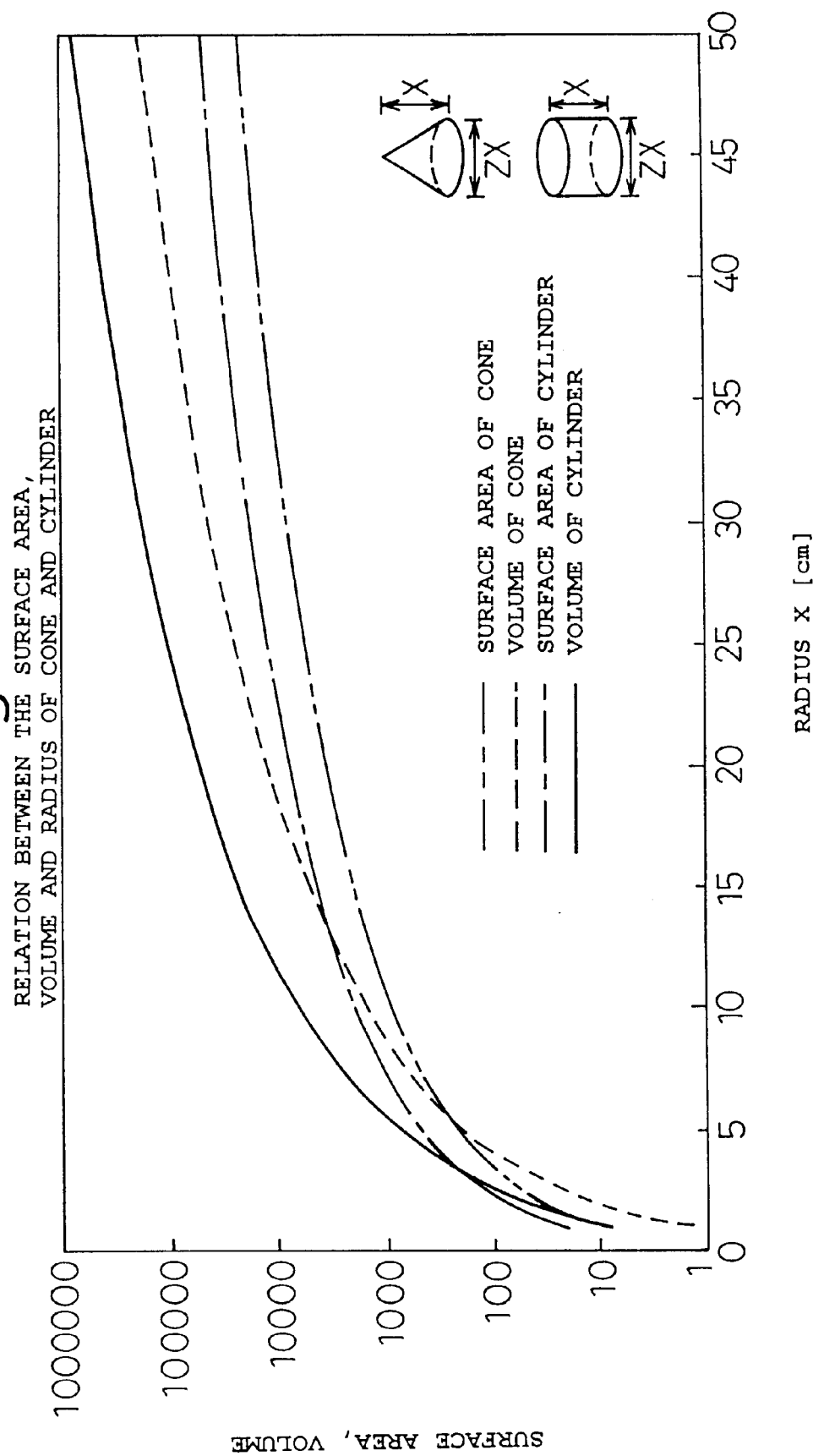

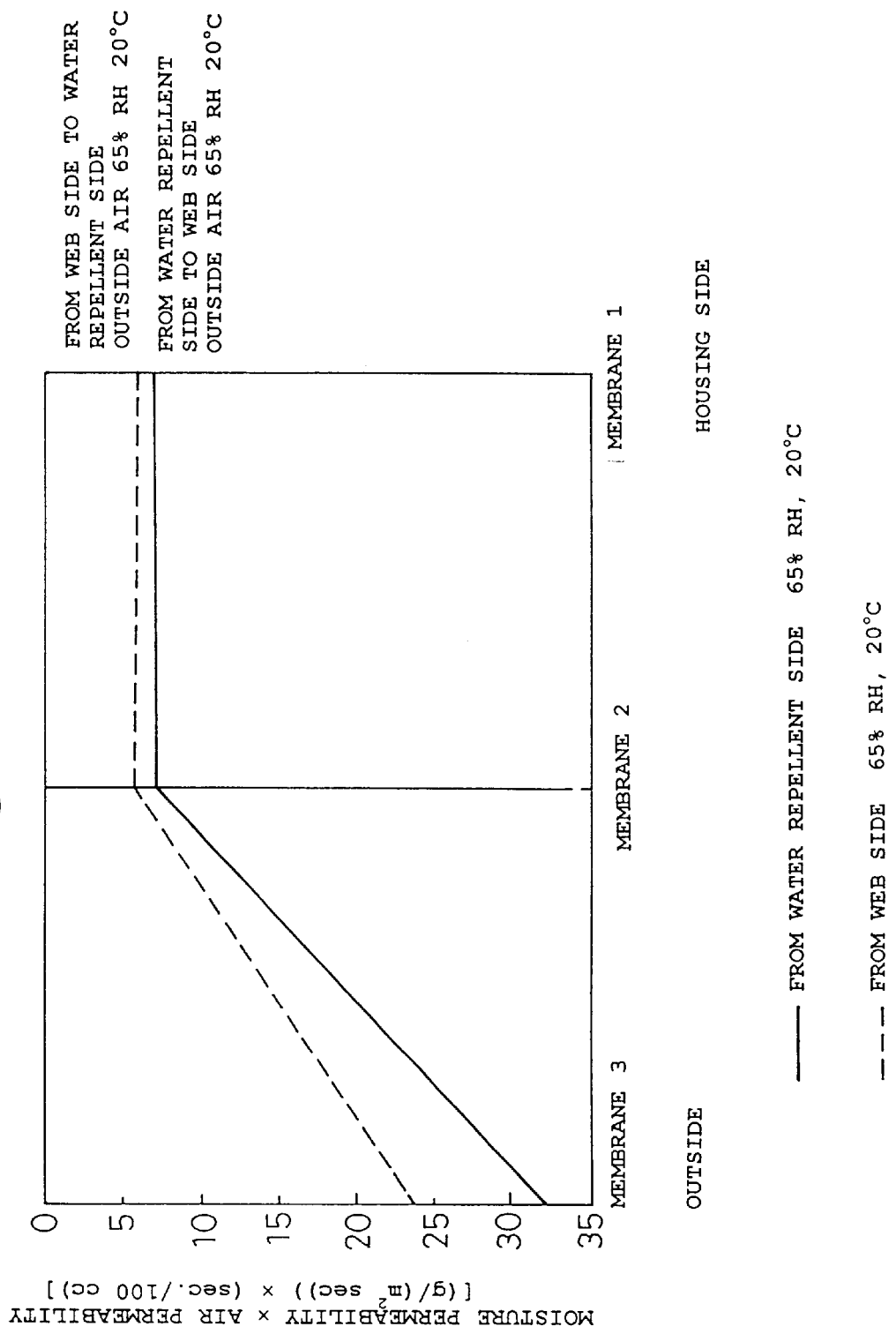

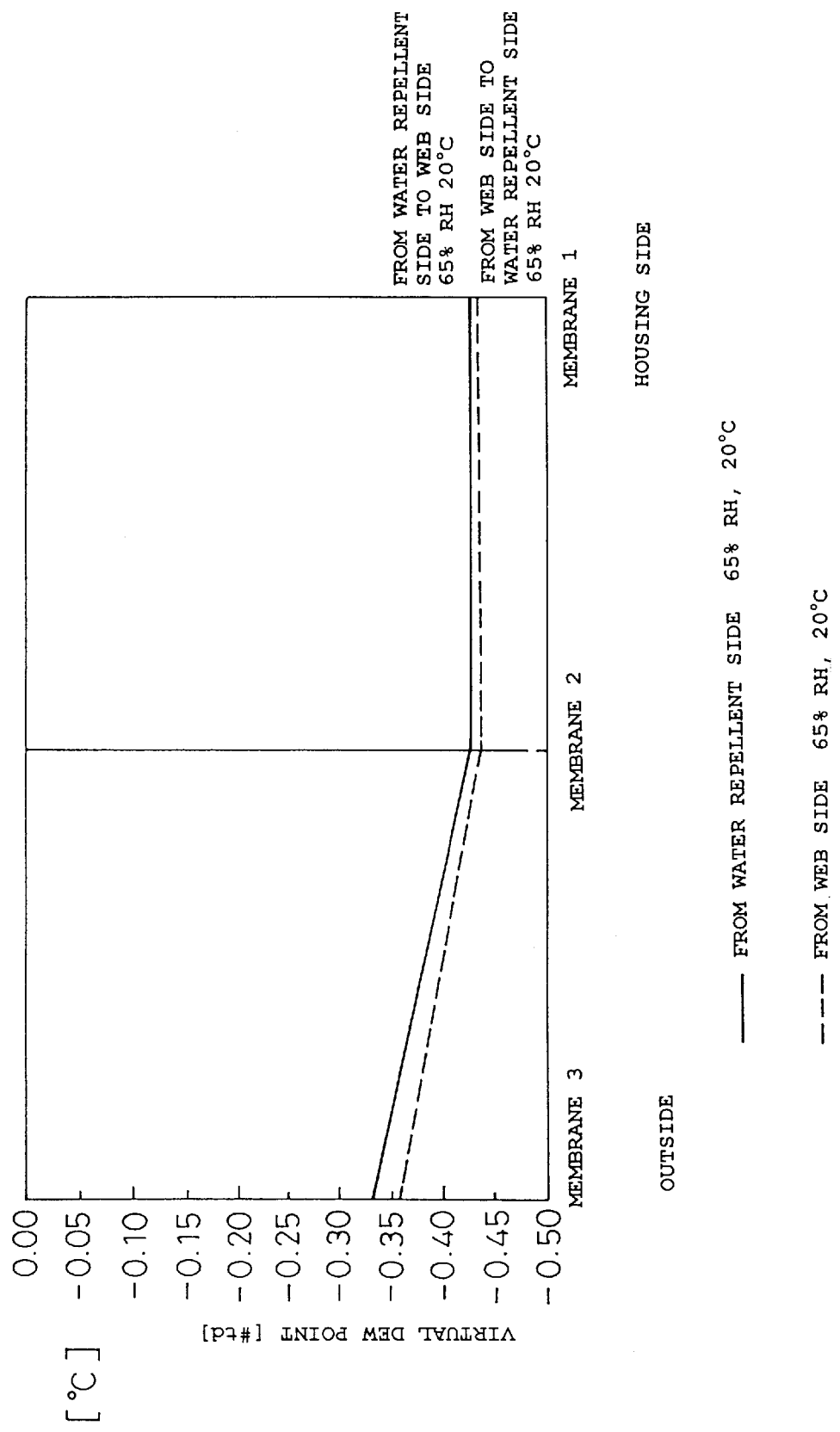

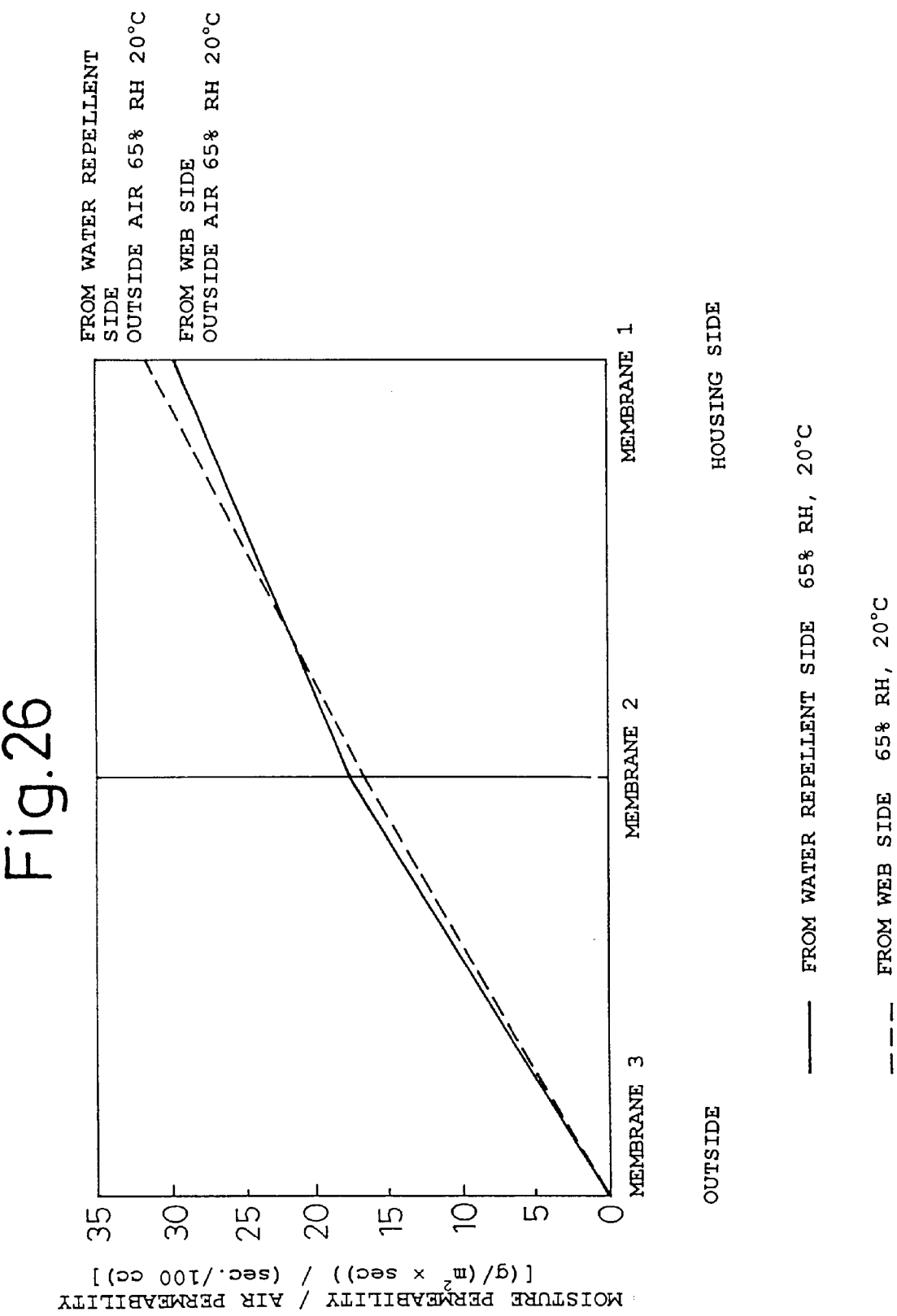

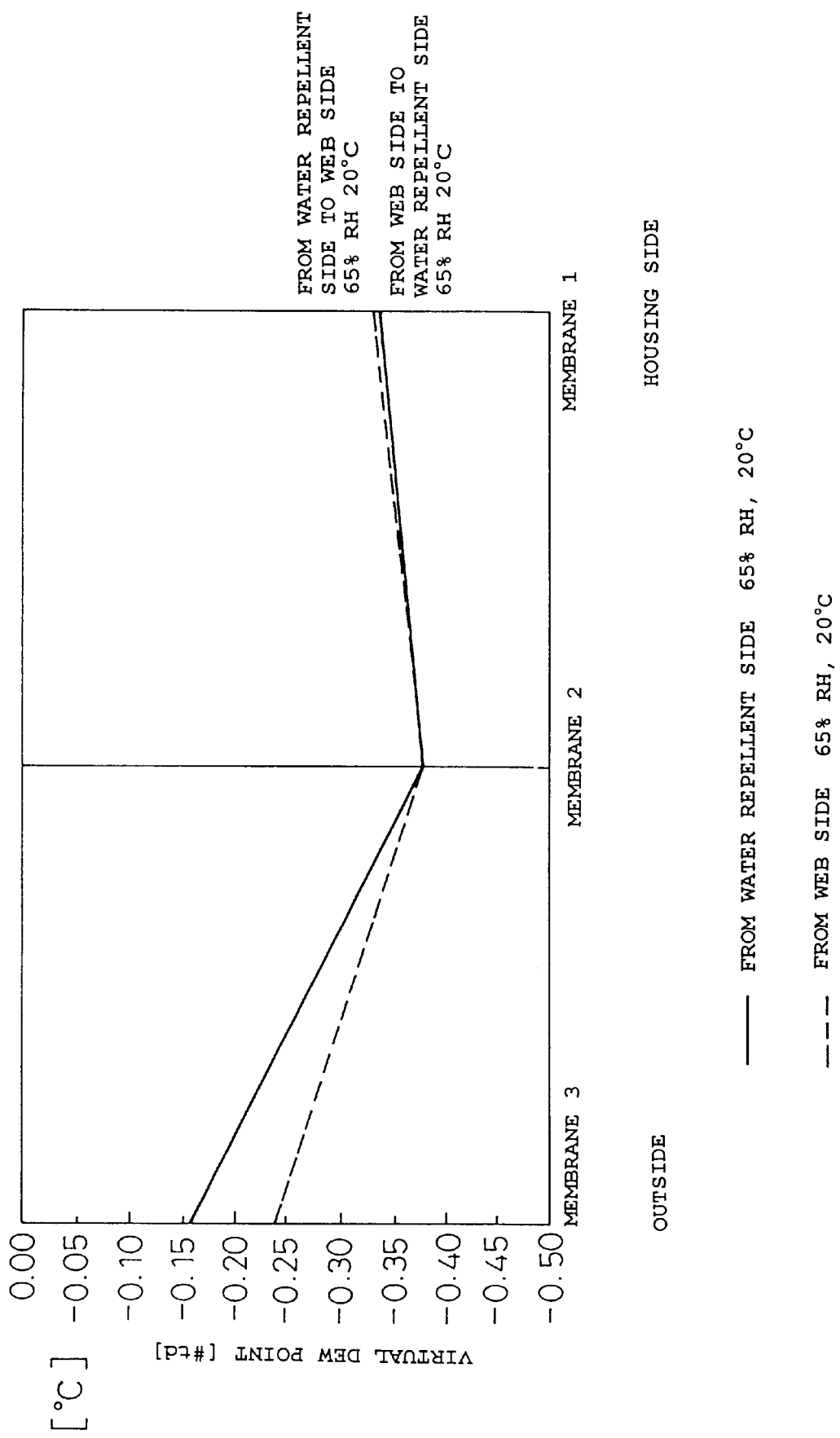

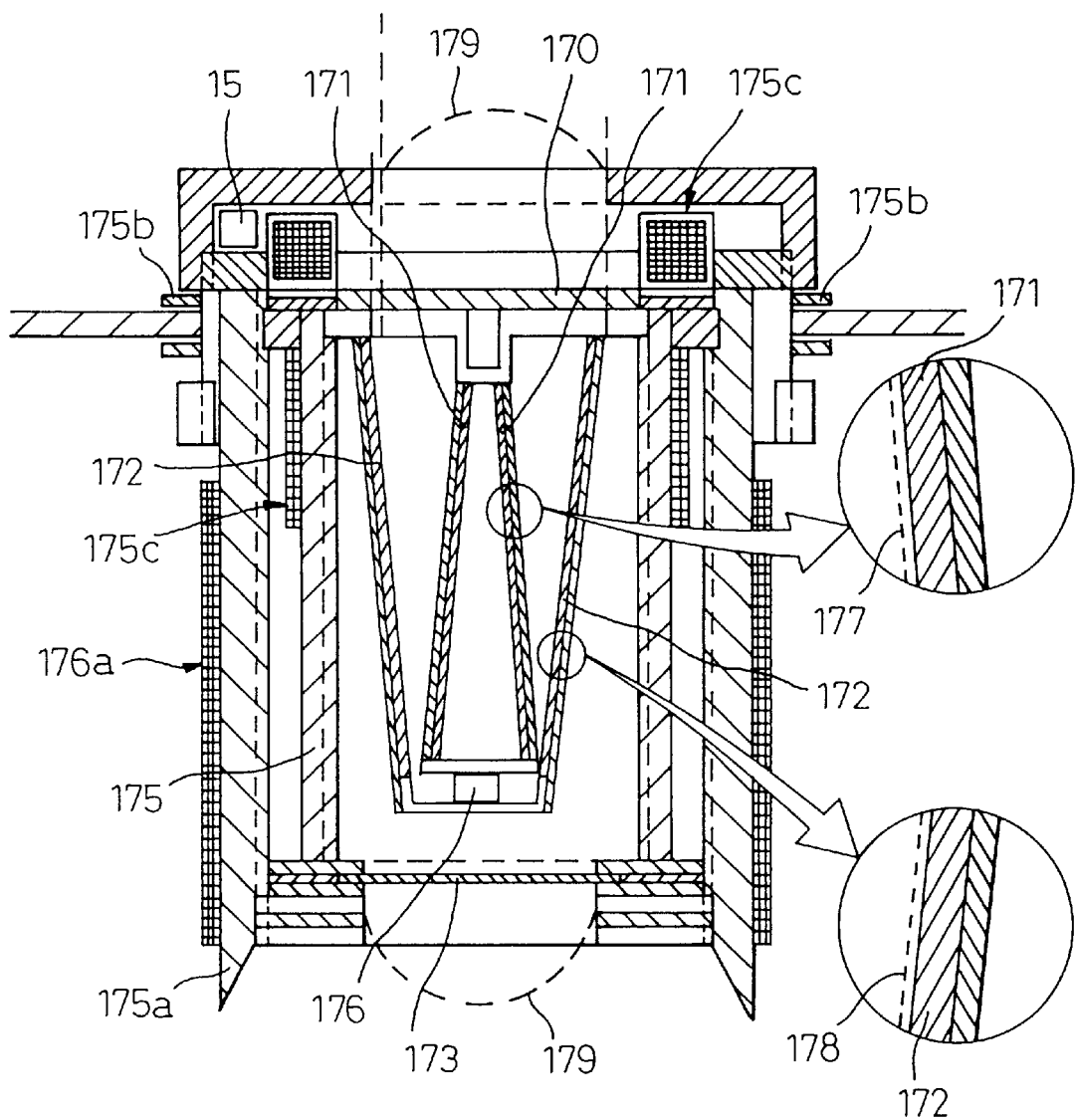

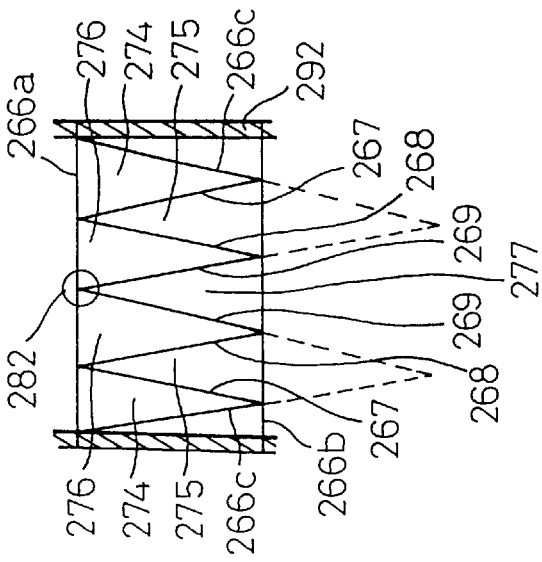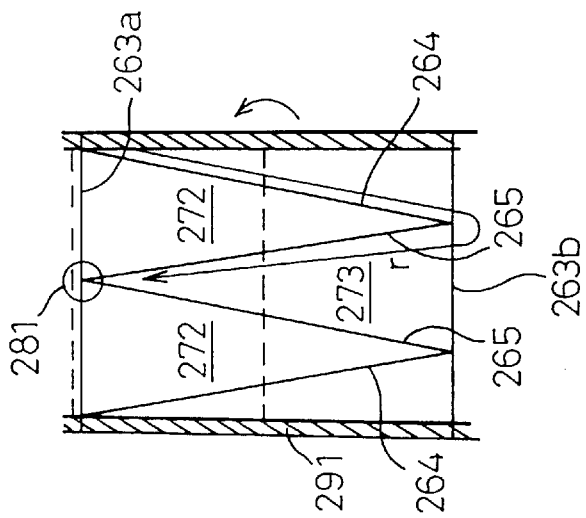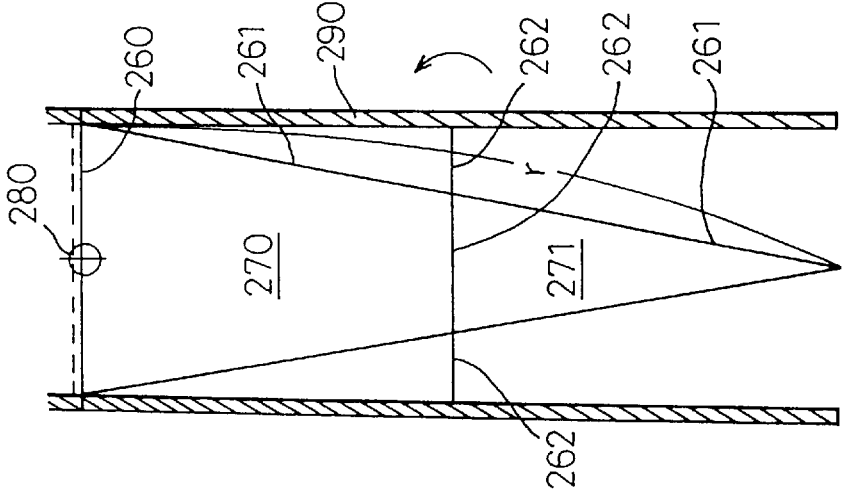

VAPOR MOVEMENT CONTROLLING DEVICE

TECHNICAL FIELD

The present invention relates to a water vapor movement control apparatus that produces a directional property for the movement of water vapor between two spaces of differing humidity. The apparatus can be used as a dehumidifier for elimination of water vapor and moisture out of enclosed spaces in machines installed outdoors and storage housings that are placed outdoors or indoors and are prone to moisture increase, or out of the internal spaces of rooms in which humans live; it can also be utilized as a small water vapor movement control apparatus or dehumidifier for machines, housings and small rooms, that can be operated at very low power. The apparatus can also be used as a water vapor movement control apparatus, humidifier or dryness protector which draws water vapor from the outside to maintain a high condition of humidity in order to prevent dryness.

BACKGROUND ART

Conventional apparatuses for removal of water vapor from the air include electric dehumidifying air conditioners that draw in air, cool it with an evaporator to cause condensation, separate the moisture, and then immediately cool the condenser. Another method employs hygroscopic agents for chemical dehumidification of small spaces such as drawer chests and housings.

Electric dehumidifying air conditioners of the prior art require fans or pumps to draw in the moisture-containing air and cool it, and these have increased the sizes of apparatuses, thus adding to production costs. Because conventional electric dehumidifying air conditioners also require operation of the fans or pumps in order to maintain the dry state of the dehumidified spaces, their operating costs are higher.

Chemical dehumidification methods employing hygroscopic agents have limits to their moisture uptake volumes, and require exchange or regeneration of the hygroscopic agents, which also increases costs.

It is an object of the present invention, as a technical means aimed at solving the aforementioned problems of the prior art, to provide a water vapor movement control apparatus with a small size and with very low power consumption, capable of maintaining unidirectional movement of water vapor between two spaces with different humidity levels over long periods of time, in order to dehumidify or humidify one of the spaces while minimizing operation costs.

DISCLOSURE OF THE INVENTION

According to the invention there is provided a water vapor movement control apparatus that moves water vapor from a first space that contains water vapor in the air to a second space that is separate from the first space, the water vapor movement control apparatus being provided with an insulated channel connecting the first space with the second space into which the water vapor of the first space is to be moved, a plurality of moisture-permeable membranes which are waterproof and air-permeable provided inside the channel, a plurality of chambers formed in the channel by the moisture-permeable membranes, a Peltier element that creates a temperature gradient so that the air in the chambers is always at lower temperature toward the second space end, and grounded conductive porous bodies situated proximally adjacent to the moisture-permeable membranes of the chambers which are heated and cooled by the Peltier element, wherein each of the moisture-permeable membranes has a water-repellent side and is situated inside the channel with the water-repellent side facing the second space, the middle moisture-permeable membrane among the plurality of moisture-permeable membranes forms an approximately conical shape, the plurality of chambers include at least one chamber with an approximately conical space enclosed by an approximately conical moisture-permeable membrane, the heated side or cooled side of the Peltier element is thermally connected with the conductive porous bodies via a heat transfer body, and the parameter (moisture permeability)×(air permeability) of each of the plurality of moisture-permeable membranes decreases for the moisture-permeable membranes toward the second space end, so that water vapor in the first space is moved into the second space.

According to another feature of the invention, there is provided a water vapor movement control apparatus that moves water vapor from a first space that contains water vapor in the air and is enclosed by a metal housing wherein the outside air has a large temperature fluctuation rate, to a second space that is separate from the first space and whose air has a small temperature fluctuation rate, the water vapor movement control apparatus being provided with an insulated channel connecting the first space with the second space into which the water vapor of the first space is to be moved, a plurality of moisture-permeable membranes which are waterproof and air-permeable provided inside the channel, a plurality of chambers formed in the channel by the moisture-permeable membranes, a Peltier element that creates a temperature gradient so that the air in the chambers is always at lower temperature toward the second space end, and grounded conductive porous bodies situated proximally adjacent to the moisture-permeable membranes of the chambers which are heated and cooled by the Peltier element, wherein each of the moisture-permeable membranes has a water-repellent side and is situated inside the channel with the water-repellent side facing the second space, the middle moisture-permeable membrane among the plurality of moisture-permeable membranes forms an approximately conical shape, the plurality of chambers include at least one chamber with an approximately conical space enclosed by an approximately conical moisture-permeable membrane, the heated side or cooled side of the Peltier element is thermally connected with the conductive porous bodies via a heat transfer body, and the parameter (moisture permeability)×(air permeability) of each of the plurality of moisture-permeable membranes increases for the moisture-permeable membranes toward the second space end, so that water vapor in the first space is moved into the second space.

According to yet another feature of the invention, there is provided a water vapor movement control apparatus that moves water vapor to a first space that contains water vapor in the air and is enclosed by a metal housing wherein the air has a large temperature fluctuation rate, from a second space that is separate from the first space and whose air has a small temperature fluctuation rate, the water vapor movement control apparatus being provided with an insulated channel connecting the first space with the second space which is the source of water vapor into the first space, a plurality of moisture-permeable membranes which are waterproof and air-permeable provided inside the channel, a plurality of chambers formed in the channel by the moisture-permeable membranes, a Peltier element that creates a temperature gradient so that the air in the chambers is always at lower temperature toward the first space end, and grounded conductive porous bodies situated proximally adjacent to the moisture-permeable membranes of the chambers which are heated and cooled by the Peltier element, wherein each of the moisture-permeable membranes has a water-repellent side and is situated inside the channel with the water-repellent side facing the second space, the middle moisture-permeable membrane among the plurality of moisture-permeable membranes forms an approximately conical shape, the plurality of chambers include at least one chamber with an approximately conical space enclosed by an approximately conical moisture-permeable membrane, the heated side or cooled side of the Peltier element is thermally connected with the conductive porous bodies via a heat transfer body, and the parameter (moisture permeability)×(air permeability) of each of the plurality of moisture-permeable membranes decreases for the moisture-permeable membranes toward the second space end, so that water vapor in the second space is moved into the first space.

According to a preferred embodiment of the invention, small approximately conical moisture-permeable membranes may be inserted in the opposite direction in the approximately conical chamber spaces formed by the approximately conical moisture-permeable membranes, to form a ring of a plurality of approximately conical chambers, and a Peltier element may be provided in the center of the moisture-permeable membrane serving as the base of the approximate cone.

Also, the top of the approximate cone where the Peltier element is inserted at the center of the moisture-permeable membrane is preferably cooled and heated.

It may also be used for elimination of water vapor from a machine housing into the outside air, if the first space is the space in a housing situated in the outdoor air and the second space is the outside air.

Alternatively, it may be used to move water vapor in the air into a housing space, if the first space is the outside air and the second space is the space in a housing situated in the air.

The term "air permeability" used throughout this specification is as defined according to JIS.

According to the present invention, first and second spaces with different temperature environments are connected together by way of a channel. The outer perimeter of the channel is insulated, so that the condition inside the channel is not affected by the temperature of spaces around the perimeter of the channel that cannot be controlled.

A plurality of moisture-permeable membranes are provided inside the channel, and at least one of them is an approximately conical moisture-permeable membrane, with at least two chambers provided in the channel. The space inside at least one of the chambers is an approximately conical space.

According to the invention, if the value of the (moisture permeability)×(air permeability) for each moisture-permeable membrane is treated as a parameter, a difference in the water vapor permeation rate is produced due to the difference in this parameter, and the fact that water vapor easily moves from larger to smaller values for this parameter is utilized. In other words, when a difference in humidity exists between two spaces, the water vapor will basically tend to migrate in the direction of lower humidity through the channel, but if the values of the aforementioned parameters of the moisture-permeable membranes decrease, the migration of water vapor will be accelerated by the water vapor permeation rate (the product of (moisture permeability)×(air permeability)), or migration of water vapor in the other direction will be decelerated, thus increasing the directional property of the water vapor migration.

The temperature in a metal housing situated outdoors under the effects of wind undergoes drastic fluctuations above and below the atmospheric temperature of 15–20° C., for example, often reaching −5° C. to 30° C., and therefore if the moisture-permeable membranes with smaller values for the aforementioned parameter are oriented to the atmosphere side while those with higher values for the parameter are oriented to the housing side, the water vapor in the housing is strongly urged in the direction of discharge, thus dehumidifying the housing. In the case of a plastic housing having high insulating properties and a low inside temperature fluctuation rate, the moisture-permeable membranes with lower values for the parameter are placed at the atmosphere end.

A plurality of chambers are provided in the channel in order to partition small spaces in the chambers so that the temperature and pressure conditions in the partitioned spaces can easily be brought to the conditions necessary for water vapor movement control, and in order to increase the sensitivity of water vapor movement due to the difference in temperature and pressure between the two spaces. In addition, by forming partitions in the chambers, it is possible to achieve heating and cooling by a small Peltier element to increase the temperature difference. The temperature difference between the chambers caused by the Peltier element is a temperature difference which prevents condensation, such as about 2–5° C.

According to the invention, the sides of the moisture-permeable membranes which face the second space are water repellent. This causes water vapor that has condensed on the water repellent side to be released and move into the second space, thus preventing its penetration through the moisture-permeable membranes toward the first space side. An advantageous effect is also exhibited whereby the condensation on the water repellent side prevents reverse movement of the water vapor. When the condensation on the water repellent side is released it absorbs heat of evaporation, thus cooling the chambers under the water repellent side and increasing the temperature difference, thus increasing the directional property of the water vapor movement. In particular, it helps to control movement of water vapor in the direction from the lower chambers to the upper chambers. In addition, the water repellent side has a relatively negative electric charge and thus attracts $Na^+$ ions from NaCl, which is effective for preventing penetration of NaCl and thus minimizing salt damage.

The conductive porous bodies are provided separately from both the upper and lower sides of the moisture-permeable membranes and are grounded in order to prevent the influence of the moisture retaining dielectric material forming the outer walls of the chambers, i.e. the walls of the channel, on the rate of water vapor movement. The conductive porous bodies also minimize electrification of the moisture-permeable membranes to prevent reduction in the moisture permeability of the moisture-permeable membranes. This prevents abnormal electrification in cases of large water vapor movement. The conductive porous bodies also facilitate convection in cases of low water vapor movement. In addition, the conductive porous bodies are also good conductors of heat transfer produced by heating or cooling by the Peltier element, to thus facilitate temperature control in the chambers.

One of the chambers adjacent to the Peltier element is heated via the conductive porous body while another chamber is cooled via the conductive porous body, thus producing a temperature difference (temperature gradient) between the chambers. Water vapor moves in the direction of lower pressure. It is therefore possible to reinforce the directional property of the water vapor movement based on temperature. Managing the temperature of the chambers and porous bodies also controls condensation to guarantee the directional property of the water vapor movement.

Controlling the temperature and pressure in the chambers by the Peltier element in this manner increases the directional property of the water vapor movement or inhibits movement of water vapor in the reverse direction, thus maintaining the directional property of the water vapor movement. The conductive porous bodies of the moisture-permeable membranes prevent electrification of the water vapor while also preventing loss of the directional property of water vapor movement caused by static electricity due to the dielectric material of the moisture-permeable membrane and the channel walls, thus allowing smoother movement of water vapor from one space into the other space.

The following explanation concerns the reason for also forming the middle moisture-permeable membrane of the invention into an approximately conical shape.

It is necessary to provide modifications whereby three types of control, control of natural convection by volume contraction and expansion, control of the percentage loss per unit area with respect to the direction of movement of the retained heat energy, and control achieved by utilizing the difference in heat conductivities of the insulators, etc., are combined while making use of the properties of the materials constituting the apparatus to render the opposing energy gradients in the direction of movement compatible with the natural thermal conductivity. In other words, the opposition of the thermal energy gradient toward the direction of movement is basically overcome by a combination of a heat conductor and an insulator.

The supplementary means for satisfying this relationship is the combination of the chamber surface areas. For this purpose, the chambers may be formed in approximately conical shapes or truncated approximate conical shapes. That is, when the frame or mesh is constructed of the same heat conducting material, for example, heat transfer occurs proportional to the length, and therefore the length may be treated as a variable to allow adjustment of the temperature gradient at the desired location.

This is very important for the present apparatus which is assumed to have a weak consumption current, and it is a particularly effective means in cases where the construction material has a high heat transfer rate, and no insulating material is used.

As regards the area as well, formation of the moisture-permeable membranes in an approximately conical shape can guarantee a large area and thus also drastically increase the amount of movable water vapor, compared to situating moisture-permeable membranes disposed across the channel vertically. Additional surface area also increases the energy loss through release by radiation from the surface or heat of evaporation, in proportion to the surface area.

Furthermore, since increasing the length in the axial direction increases the heat resistance, the heat transfer rate in the axial direction is also reduced, but increasing the length increases the surface area resulting in greater heat loss; consequently, the relationship between heat transfer and heat loss differs depending on whether the shape is cylindrical or conical. A cone has a smaller rate of surface area increase in the lengthwise direction compared to a cylinder, and therefore the reciprocal relationship means that the conduction rate loss factor per unit of area is smaller with a cone than with a cylinder.

In addition, in the case of a cylinder, the minimum value for the surface area is obtained when the diameter and height are equal, but for a cone it is obtained when the height is equal to the diameter multiplied by the square root of 3, or 1.73 (see FIG. 23). The thermal conductivity may therefore be adjusted by means of making the apparatus construction satisfy the relationship between length and surface area.

By using approximately conical moisture-permeable membranes to partition the chambers, and also nesting large and small moisture-permeable membranes together, it is possible to form more compact chambers, while the conical chamber spaces result in a larger surface area with respect to the volume and thus reduced heat loss, to thereby achieve a more efficient directional property for the water vapor movement.

The moisture-permeable membranes will now be explained in further detail.

FIG. 14 is a graph wherein the product of moisture permeability and air permeability, i.e. (moisture permeability)×(air permeability), is converted into the dew point. This indicates the relative temperature at which physical saturation, or the dew point, is reached in the interior of the pores inside the moisture-permeable membranes. Here there are shown differences in relative dew point temperatures plotted against the horizontal axis for a first moisture-permeable membrane, second moisture-permeable membrane and third moisture-permeable membrane, with the left side of the graph representing the housing side position.

In FIG. 14, the air permeability values are plotted as measured according to JIS-P-8117, and because of air leakage during air permeability measurement at the section where the test piece was inserted, particularly from the nonwoven fabric side toward the water-repellent side, it appears that a fixed amount rapidly permeates. This is air leakage due to three-dimensional irregularities in the nonwoven fabric; the graphs in FIGS. 24 to 27 are based on results where the measurement was made with sealing to prevent this air leakage.

FIGS. 24 to 27 are graphs showing the properties of the moisture-permeable membranes based on the results of measurement at 65% RH, 20° C.

FIG. 24 shows the values for the products of (moisture permeability)×(air permeability) for each moisture-permeable membrane, where the units are $(g \cdot sec)/(m^2 \cdot sec \cdot 100\ cc) = g/(m^2 \cdot 100\ cc)$, and these are quantities representing the ease of permeability for 100 cc at 65% RH, 20° C. compared to the water vapor mass. FIG. 25 shows the values for the products (moisture permeability)×(air permeability) for each moisture-permeable membrane at 65% RH, 20° C., as values converted to virtual dew points using the dew point equation given above, where a comparison is made with the heat content in consideration of the heat transfer property of the water vapor.

FIG. 26 shows the values for (moisture permeability)/(air permeability). The units are $(100\ cc \cdot g)/(m^2 \cdot sec^2)$, and these are quantities comparing the water vapor permeability acceleration per unit of area. FIG. 27 shows the values for (moisture permeability)/(air permeability) for each moisture-permeable membrane as values converted to the virtual dew points using the dew point equation given above, where a comparison is made with the heat content in consideration of the heat transfer property of the water vapor.

This graph allows plotting of the position coinciding with the temperature level difference between chambers, in terms of enthalpy, or water vapor mass (water vapor saturation vapor pressure curve).

If the water vapor is considered to be a carrier of thermal energy, according to the water vapor mass curve it can be considered interchangeable with enthalpy, and therefore superimposing these two water vapor mass curves is significant in that it can be calculated as the heat energy content due to the mass of water vapor between each chamber, or in each space (the housing which is the space to be dehumidified or humidified) or on the outside air side depending on the water vapor permeating ability, which is highly significant for the conversion ability.

The water vapor permeation is basically governed by the moisture permeable membrane determined capacity of the chamber formed by each moisture-permeable membrane.

Based on the conversions at 20° C. and 40° C. in this graph, the pressure difference produced by the temperature level difference is represented as a heat energy level difference at a specific temperature which is dependent on the water vapor mass at each location.

In FIG. 14, the results of each measurement at approximately 20° C. are shown as efgh, and the results of each measurement at approximately 40° C. are shown as abcd. FIG. 15 is a schematic representation of FIG. 14, plotted on an enthalpy and water vapor pressure curve. The outside air side or the space to be dehumidified or humidified is indicated by AU 1–4. The separating ability unique to each moisture-permeable membrane is represented by a/(g-h)× 100(%). Process af is thought to act to prevent the temperature level difference of the dew point from becoming too large, in order to avoid drastic influx from the outside air side. It is judged that during discharge, f has an alleviating effect to facilitate movement of the mass that is to be dehumidified or that is to be humidified.

The series is as follows, in order of decreasing energy.

AU1>a>AU2; AU3>g; AU4>h

Since the energy moves and its movement halts when it reaches equilibrium due to stabilization from the higher energy state to the lower state, the direction of energy movement is defined at each virtual point (AU-h). That is, since the energy moves from the high direction to the low direction, it is defined as follows.

AU1→a→AU2; AU3→g; (AU3-AU4)→g,h→f; h→AU4

Consequently, assuming that the only movement of energy possible is from the high direction to the lower direction, if water vapor at AU2 at a temperature of 12° C. is moved in the apparatus, a-h must exist at a lower energy position than the water vapor energy at AU2 at a temperature of 12° C. Thus, the separating efficiency can be altered as desired based on this slope.

When a Peltier element is employed the cooling and heating are accomplished simultaneously, so that this relationship must be satisfied throughout the entire apparatus.

When a heating coil or heater is used as the heating means, by itself it has an inferior ability to cause movement from the warm direction to the cold direction, compared to a Peltier element, and supplementary means is therefore necessary for cooling using a material with high heat absorption, i.e. a material with high heat conductivity, for example, a metal material such as aluminum (or an aluminum alloy) or copper (or a copper alloy) as a cooling body; in this case, it becomes necessary to provide fin shapes to increase the heat release area.

This means is based on theory and calculated from the heat energy content retained by the water vapor when considering discharge from the outside air side and the reverse flow phenomenon, based on the analysis results for a basic model of the present apparatus.

As shown in the block membrane diagram, if each block is assumed to be water vapor, it is recognized as heat energy. That is, since the energy migration is from the high direction to the low direction, there is gradual migration (movement) from the inside of the housing to the outside air, on a block diagram.

For the lower block diagram, there is a problem that, until either the chamber on the first space side or the chamber on the second space side reaches a state of equilibrium first, equilibrium is reached from the housing side, from the chamber on the first space side toward the chamber on the second space side, or equilibrium is reached by movement toward the housing side, from the chamber on the second space side to the chamber on the first space side.

Because of the movement from the high direction to the low direction due to the heat energy of the water vapor as enthalpy, when it is attempted to induce movement by a Peltier element or other active means, the following conditions are necessary as a function of the moisture-permeable membrane for the directional property toward the desired dehumidification. In the case of the first space which has a smaller temperature fluctuation than the second space, movement occurs from the second space side toward the direction of the first space side, and therefore movement occurs first from the chamber on the second space side to the chamber on the first space side.

This depends on the difference between the moisture permeability and the air permeability of the moisture-permeable membrane. That is, although the water vapor tends to penetrate since the moisture permeability slope decreases from the second space side toward the first space side, the air permeability is the reciprocal, and therefore the product (moisture permeability)×(air permeability) is evaluated as the parameter for comparison of the degree of movement of water vapor. Because this parameter increases from the second space side toward the first space side, that is, since the percentage of water vapor present (moving) increases, it appears as a relative adiabatic cooling phenomenon, but condensation occurs when the amount of energy of the moving water vapor at this time reaches equilibrium with the degree of cooling due to the adiabatic cooling. In other words, when using a heat-insulating plastic housing with a low difference between the amount of energy of the moving water vapor and the amount of energy due to adiabatic cooling, the moisture permeability is higher from the first space toward the second space, thus facilitating movement of the water vapor toward the outside because of the difference in the diffusion rate, while diffusion occurs by the rate depending on the difference in moisture permeability between the moisture-permeable membrane 3 and the moisture-permeable membranes 2, 1; however, the water vapor moving from the outside toward the outside chamber and inside chamber, which opposes this rate, moves from the first space to the second space until the point at which the diffusion rate and the diffusion energy reach equilibrium.

When the first space is a space in a metal housing, for example, where the cooling or heating rate is notably larger than the outside air, the moisture which has condensed with adiabatic cooling when drawn in due to the fact that the degree of energy movement accompanying moisture permeation is smaller than the degree of energy reduction due to adiabatic cooling, is drawn in and moves toward the housing side, and the migration of the heat energy due to condensation toward the aggregated moisture causes the moisture permeability fluctuation to rise above the heat energy accompanying movement of water vapor due to the set difference in moisture permeability percentage from the housing side toward the outside air of the second space, while each difference due to draw in (cooling) on the housing side acts to humidify the inside of the housing, and the evaluation thereof is by the same equation as for dehumidification.

Consequently, in the case of a housing with a large heat energy fluctuation, for example, a metal housing, when the fluctuation in heat energy is notably larger than the degree of heat energy movement accompanying the water vapor movement, i.e. than the degree of water vapor permeation of the moisture-permeable membrane, the migration of water vapor is facilitated toward the housing because of the greater distribution difference (FIG. 11); however, when water vapor migrates from the housing side to the outside air side, the adiabatic cooling converts the water vapor to water and it is pulled by the water-repellent side to the outside air. Consequently, the set conditions must be changed depending on whether the amount of heat energy is constantly driven by the Peltier element or whether it is driven only during the daytime.

FIGS. 21A to 21C show the relationship between a metal housing or plastic housing placed outdoors and the sizes of the parameters (moisture permeability)×(air permeability) of the moisture-permeable membranes, which function in a water vapor movement control apparatus according to the invention. In particular, FIG. 21A is a fail-safe case where the size arrangement of the moisture-permeable membranes are such that the moisture-permeable membranes function in the direction of dehumidification even when the Peltier element is not operating.

FIGS. 22A to 22C show the conditions of a metal housing or plastic housing, the sizes of the parameters (moisture permeability)×(air permeability) of the moisture-permeable membranes, and the manner of imparting a temperature gradient with a Peltier element, for a case where a water vapor movement control apparatus according to the invention is used as a humidifying apparatus that moves water vapor into the housing; basically, however, by setting the water vapor movement direction properties of FIGS. 22A to 22C they may function for either dehumidification or humidification.

The functioning of the moisture-permeable membranes and chambers according to the invention is divided into case "a" with only a single moisture-permeable membrane in the channel, case "b" with two single moisture-permeable membranes in the channel forming a single chamber, and case "c" with three or more single moisture-permeable membranes in the channel forming a plurality of chambers; the differences in effects will become apparent by considering the following aspects.

(1) The aspect of temperature fluctuation in the partitioned space due to the outside air temperature and temperature fluctuation in the moisture-permeable membranes serving as the boundaries of the space

|  | Case a (single moisture-permeable membrane) | Case b (single chamber) | Case c (plurality of chambers) |
| --- | --- | --- | --- |
| Size of fluctuation | large > | medium > | small |

While it is difficult to obtain desired settings with a single moisture-permeable membrane, with one or more chambers it is possible to set the properties defined by the moisture-permeable membranes forming the boundaries thereof and by the structure of the channel.

(2) Effect of air filter

|  | Case a (single moisture-permeable membrane) | Case b (single chamber) | Case c (plurality of chambers) |
| --- | --- | --- | --- |
| Filter effect | small < | medium < | large |

(3) Aspect of heat quantity adjustment

The aspect of whether or not any conservation, reduction or adjustment of the heat quantity relationship is accomplished when heat of evaporation or latent heat of the water vapor is generated on the moisture-permeable membrane surfaces forming the boundaries of the space.

|  | Case a (single moisture-permeable membrane) | Case b (single chamber) | Case c (plurality of chambers) |
| --- | --- | --- | --- |
| Heat quantity adjustment | none | little < | much |

In the case of a single chamber, the innermost moisture-permeable membrane is more dependent on the temperature relationship between the space and the chamber, while the outermost moisture-permeable membrane is easily influenced by the temperature relationship between the chamber and outside air.

When a plurality of chambers are formed, the innermost moisture-permeable membrane is affected by the temperature relationship between the enclosed space and the chamber on the inside, while the outermost moisture-permeable membrane is affected by the temperature relationship between the chamber on the outside and the outside air; however, in the center moisture-permeable membrane, because of the fluctuation properties of the water vapor in the chamber which can be easily maintained by the inside chamber or outside chamber or the channel structure (moisture-permeable membrane support mesh, porous body set in the channel, the chamber walls, etc.), or the moisture-permeable membrane, it is easier to conserve, reduce or adjust the heat quantity relationship by the surface temperature of the moisture-permeable membrane.

(4) Other possible settings

By adjustment of the surface temperature by the heat of evaporation of water vapor through surface treatment of the Peltier element, fins, heating element, heat sink, heat insulating cavity and channel structure, it is possible to accomplish various settings to reflect desired settings based on trends that depend on the effects of the enclosed space and outer air.

|  | Case a (single moisture-permeable membrane) | Case b (single chamber) | Case c (plurality of chambers) |
| --- | --- | --- | --- |
| Settability | low | some | high |

(5) Setting of degree of water vapor movement in cases of outside air with high humidity (6) Aspect of whether or not temperature in the set space can be reduced when the outer air is of high humidity

|  | Case a (single moisture-permeable membrane) | Case b (single chamber) | Case c (plurality of chambers) |
| --- | --- | --- | --- |
| Possibility of reduction | impossible, or little possibility | possible within settable temperature conditions | possible within settable temperature conditions - easy to obtain stabilized effect |

(7) Humidity movement rate in set space

|  | Case a (single moisture-permeable membrane) | Case b (single chamber) | Case c (plurality of chambers) |
| --- | --- | --- | --- |
| Humidity movement rate | tends to be constant, depending on inside/outside temperature | can be adjusted by temperature properties set as desired | possible to achieve large fluctuation by temperature properties set as desired |

The members forming the channel (walls of the chambers) may be made of a plastic resin of vinyl chloride, PVC, PE or PET, and composite materials with laminate structures are preferred because of their excellent heat insulating properties and the fact that they minimize thermal effects through the channel walls.

The conductive porous body is preferably about #34×32 mesh and may be copper mesh, stainless steel mesh, platinum mesh, metal-plating, metal vapor deposited plastic or the like, which have good electrical conductivity and good heat conductivity, and it is isolated within 1 millimeter of the moisture-permeable membrane.

The Peltier element and the conductive porous body are coated with an insulating film (dielectric) such as a polyethylene film, on the conductive porous body and both the cooling side and heating side of both electrodes. The power consumption of the Peltier element will differ depending on the size of the chambers, but is sufficient up to about 0.5 W, which current can be adequately supplied by a solar battery. For the moisture-permeable membrane there is used a polyolefin or nylon nonwoven fabric, and it is practical to use a PE porous film on the backside thereof.

The method of grounding the conductive porous body preferably involves metal plating or coating of a metal film by metal vapor deposition or the like onto the inner side of the chamber, to form a grounded electric channel. The metal film on the inner side also has an antistatic effect on the inner side of the chamber, and prevents reduced water vapor movement due to electrification. It also accelerates temperature fluctuation on the inner surface of the chamber.

The surface of the channel wall, moisture-permeable membrane and other members according to the invention are preferably subjected to fungicidal and antibacterial treatment in order to prevent growth of mold, bacteria and the like from altering the surface properties. As fungicidal and antibacterial treatments there may be employed methods of surface treatment with copper or silver ions, oligodynamic action or application of fungicidal antibacterial agents such as ethylene glycol/benzalkonium chloride.

BRIEF DESCRIPTION OF THE DRAWINGS

FIG. 21A is an illustration showing the arrangement of moisture-permeable membranes for a case where a water vapor movement control apparatus of the invention is used as a dehumidifying apparatus.

FIG. 21B is another illustration showing the arrangement of moisture-permeable membranes for a case where a water vapor movement control apparatus of the invention is used as a dehumidifying apparatus.

FIG. 21C is another illustration showing the arrangement of moisture-permeable membranes for a case where a water vapor movement control apparatus of the invention is used as a dehumidifying apparatus.

FIG. 22A is an illustration showing the conditions for a case where a water vapor movement control apparatus of the invention is used as a humidifying apparatus.

FIG. 22B is another illustration showing the conditions for a case where a water vapor movement control apparatus of the invention is used as a humidifying apparatus.

FIG. 22C is another illustration showing the conditions for a case where a water vapor movement control apparatus of the invention is used as a humidifying apparatus.

FIG. 23 is a graph showing the relationship between surface area and volume for conical and cylindrical shapes.

FIG. 24 is a graph plotting the parameter (moisture permeability)×(air permeability) of each moisture-permeable membrane at 65% RH, 20° C.

FIG. 25 is a graph plotting the results of measuring the parameter (moisture permeability)×(air permeability) at 65% RH, 20° C. for each moisture-permeable membrane, where the products are plugged into the above-mentioned dew point equation and the results are plotted for each moisture-permeable membrane.

FIG. 26 is a graph plotting the (moisture permeability)/(air permeability) measured for each moisture-permeable membrane at 65% RH, 20° C.

FIG. 27 is a graph plotting the results of measuring the parameter (moisture permeability)/(air permeability) at 65% RH, 20° C. for each moisture-permeable membrane, where the division results are plugged into the above-mentioned dew point equation and the results are plotted for each moisture-permeable membrane.

FIG. 28 is an illustration showing another embodiment of the invention.

FIG. 29A is an illustration showing an example of forming an approximately conical chamber with an approximately conical moisture-permeable membrane according to the invention.

FIG. 29B is an illustration showing another example of forming an approximately conical chamber with an approximately conical moisture-permeable membrane according to the invention.

FIG. 29C is an illustration showing still another example of forming an approximately conical chamber with an approximately conical moisture-permeable membrane according to the invention.

BEST MODE FOR CARRYING OUT THE INVENTION

Figure 1:
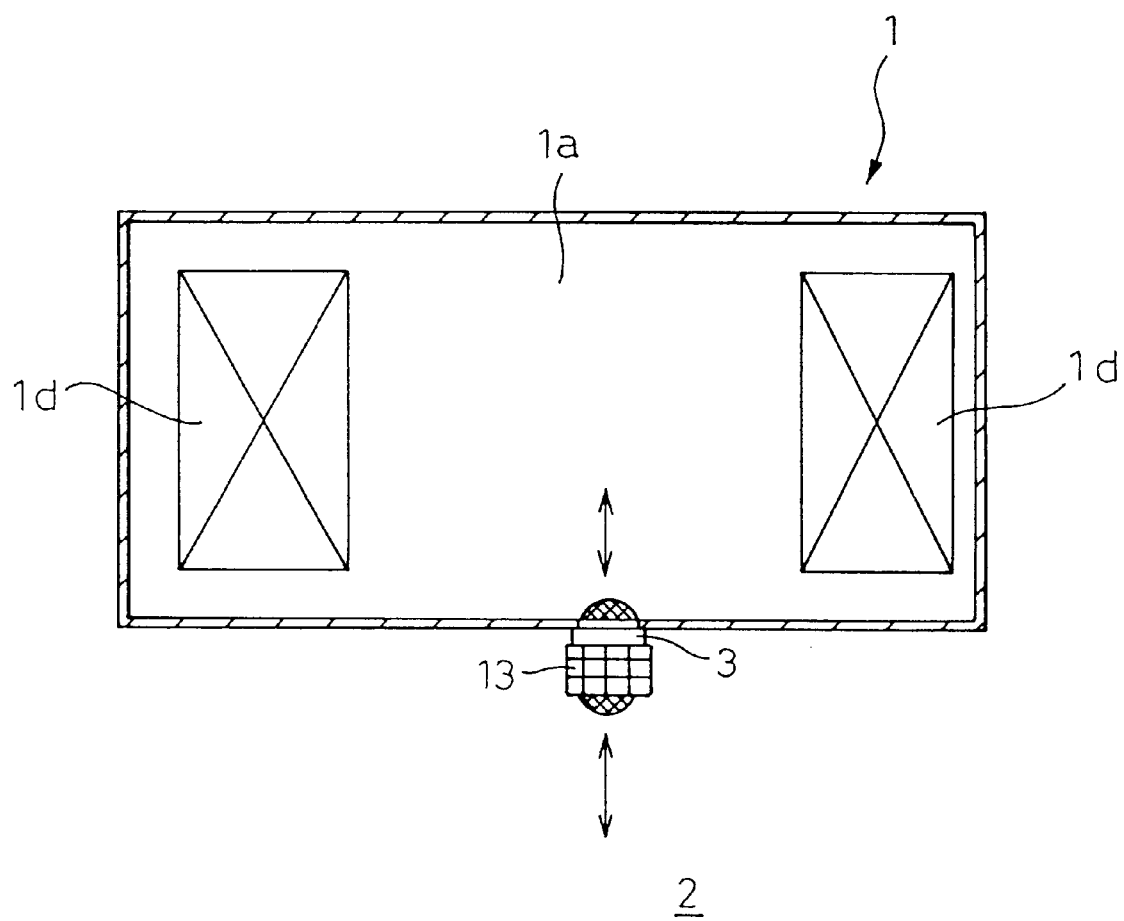
FIG. 1 is an illustration showing a water vapor movement control apparatus according to an embodiment of the invention in a state of use.

An embodiment of the present invention will now be explained with reference to the drawings.

This embodiment is employed as a water vapor movement control apparatus in an electrical device housing which is situated outdoors, wherein the space in the metal housing having a high temperature fluctuation rate is the first space and the atmosphere is the second space; two approximately conical moisture-permeable membranes are provided in a heat-insulated cylinder, with the top side of the cone as an upper airway for the inside of the cylinder to the first space, while the bottom of the cylinder is the lower airway for the air of the second space, and moisture-permeable membranes are provided in each airway while a Peltier element is provided at the center of the moisture-permeable membrane at the upper airway.

In the drawings, 1 is a metal housing with an internal volume of 125 liters, 1a is the first space in the housing 1, 1b is the bottom of the housing 1, 1c is the lower airway opening in the bottom, 1d represent electrical devices housed in the metal housing 1, 2 is the air of the second space, 3 is a channel, and 3a is a PVC heat-insulated inner cylinder forming the channel 3, which is provided with a circular groove on its upper inside. 3b is a PVC insulated outer cylinder, 3c is a screw section with a reduced contact surface area, 3d is a heat insulator provided at the upper end of the heat-insulated inner cylinder 3a, or an aluminum frame serving as a heat sink, 3e is a metal heat sink, 4 is a first moisture-permeable membrane, 5 is a second moisture-permeable membrane, 6 is a third moisture-permeable membrane, 7 is a fourth moisture-permeable membrane, 8 is a fifth moisture-permeable membrane, 9 is a conductive porous body employing a copper mesh provided at a distance of about 1 millimeter from the moisture-permeable membrane, 10 is a 0.5 watt Peltier element, 10a is an electrically insulated heat transfer body which is thermally connected with the heating side of the Peltier element 10 and the conductive porous body 9, 10b is an aluminum roof which is thermally connected with the cooling side of the Peltier element 10 and the second moisture-permeable membrane 5, 11 and 12 are water-repellent treated vinyl chloride dust-proof, insect-proof nets, 13 is a solar battery for the Peltier element which is wound around the outer perimeter of the heat-insulated inner cylinder 3a, 14 is a supporting frame for the moisture-permeable membrane 5 assembled as a conical cage with aluminum rods 14 a and supports the second moisture-permeable membrane 5 from the inside while functioning as a good heat transfer body, and 15 is a power source current for the Peltier element 10, wherein the solar battery 13 power source charges a battery while supplying electricity to the Peltier element 10 for the necessary time at the prescribed voltage. In FIGS. 12A to 12C, 201 is a PE porous film serving as the water-repellent side of the moisture-permeable membrane 4, 202 is a special porous film, 203 is a nylon nonwoven fabric, 204 is a PE porous film serving as the water-repellent side of the moisture-permeable membranes 5,6, 205 is a special porous film of the moisture-permeable membranes, 206 is a polyolefin nonwoven fabric, 207 is a PE porous film serving as the water-repellent side of the moisture-permeable membranes 7,8, 208 is a special porous film, and 209 is a polyolefin nonwoven fabric.

Figure 10:
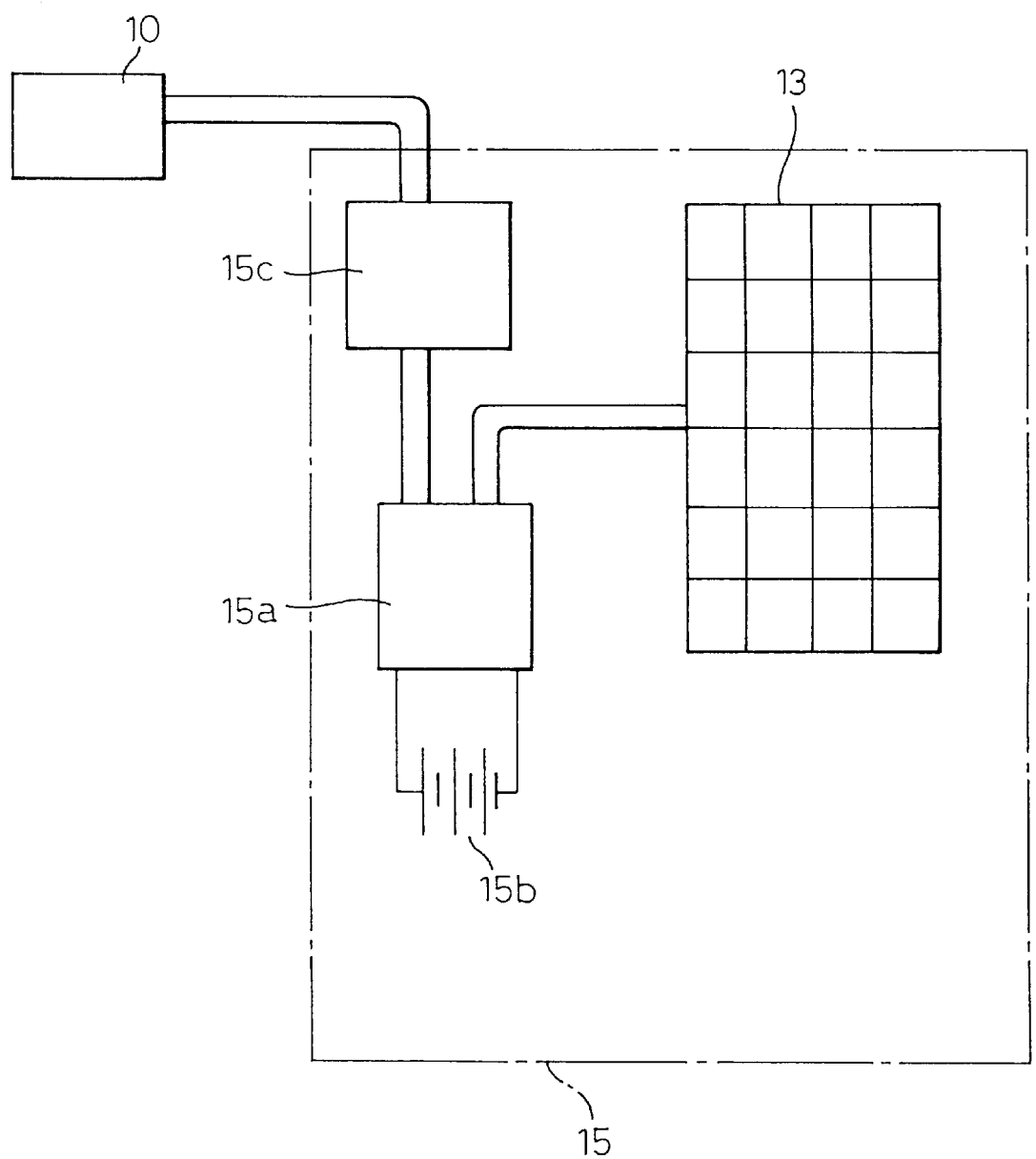
FIG. 10 is a driving circuit diagram for a Peltier element according to an embodiment of the invention.

FIG. 10 is a circuit diagram for operation of the Peltier element, wherein a battery 15b is charged with electromotive force from a solar battery 13 through a charging circuit 15a, and a timer device 15c allows activation only during the daytime, or all day long.

The screw section of this embodiment is treated with a waterproof seal on certain portions or on the surface portions to prevent water leakage and ensure airtightness.

The moisture-permeable membrane may employ a highly dielectric material such as tetrafluoroethylene for part or all of the film on the water-repellent side.

A carbon fiber or highly conductive metal fiber nonwoven fabric may be used as the nonwoven fabric to prevent electrification of the moisture-permeable membrane or to accelerate heat transfer (transfer between the nonwoven fabric side and the water-repellent side).

Naturally, it is advantageous for the thickness of the membrane to be as low as possible as a channel of movement of water vapor in order to ensure moisture permeability, so long as the water-repellent property is not inhibited and so long as the waterproof property is not inhibited.

The moisture permeabilities, air permeabilities, values for the parameter (moisture permeability)×(air permeability) and the maximum pore sizes for moisture-permeable membranes 4, 5, 6, 7 and 8 used for the embodiments were as follows.

| Moisture-permeable membrane | Moisture permeability | Air permeability | Parameter | Maximum pore size |
|---|---|---|---|---|
| 1st membrane 4 | 250 | 18000 | 4,500,000 | 1.0 $\mu m$ |
| 2nd membrane 5 | 2000 | 1000 | 2,000,000 | 1.5 $\mu m$ |
| 3rd membrane 6 | 2000 | 1000 | 2,000,000 | 1.5 $\mu m$ |
| 4th membrane 7 | 4600 | 350 | 1,610,000 | 2.0 $\mu m$ |
| 5th membrane 8 | 4600 | 350 | 1,610,000 | 2.0 $\mu m$ |

The test methods were according to JIS-L1099 and the JIS-P811 gas permeability test.

Figure 11:
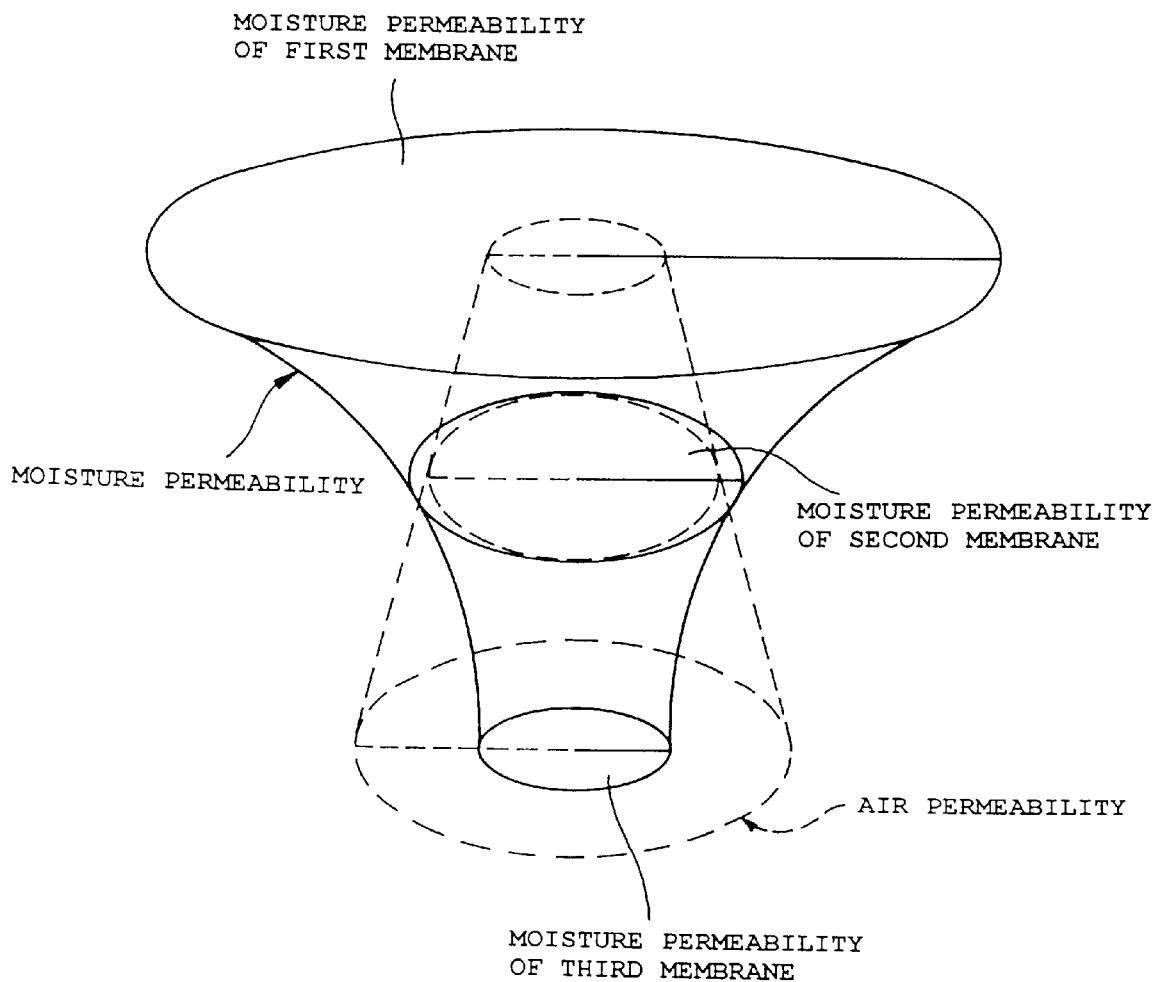
FIG. 11 is a schematic view showing the values for the parameters (moisture permeability)×(air permeability) of three moisture-permeable membranes according to an embodiment of the invention.
Figure 12A:
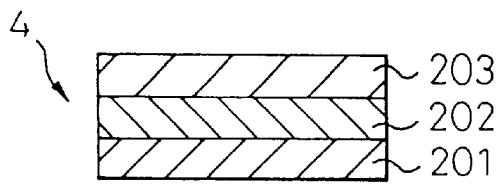
FIG. 12A is a cross-sectional view showing an example of a moisture-permeable membrane according to the invention.
Figure 12B:
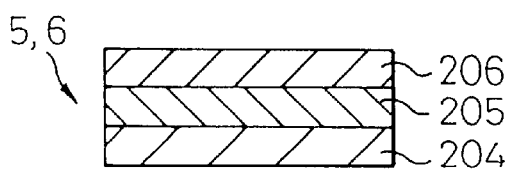
FIG. 12B is a cross-sectional view showing another example of a moisture-permeable membrane according to the invention.
Figure 12C:
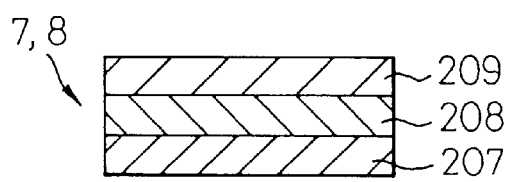
FIG. 12C is a cross-sectional view showing still another example of a moisture-permeable membrane according to the invention.

FIG. 11 shows the relationship between the values for the parameter (moisture permeability)×(air permeability) for these three different moisture-permeable membranes. The arrangements of the 1st, 2nd and 3rd moisture-permeable membranes in FIG. 11 and the 1st, 2nd/3rd and 4th/5th moisture-permeable membranes of the embodiments are opposite arrangements.

In this embodiment, when the humidity of the space 1a inside the housing 1 is higher than the humidity of the air 2, the water vapor inside the housing 1 moves from the inside space 1a of the housing 1 toward the air 2 due to the directional property of water vapor movement that depends on the degree of humidity, the size of the parameter (moisture permeability)×(air permeability) of the 1st, 2nd, 3rd, 4th and 5th moisture-permeable membranes 4, 5, 6, 7 and 8, the presence of the water-repellent side of the PE porous film serving as the water-repellent side, and the temperature gradient created by heating of the chamber 20 or cooling of the chamber 22 by the Peltier element 10; the humidity of the space 1a of the housing 1 is thereby reduced, resulting in drying.

When the humidity in the air 2 is higher and the humidity in the space 1a of the housing 1 is lower, the water vapor will tend to move from the air side toward the inside of the housing 1, but the lower values of the parameter (moisture permeability)×(air permeability) of the 1st, 2nd and 3rd moisture-permeable membranes toward the air side will inhibit water vapor movement in the direction toward the space 1a inside the housing 1. In addition, the presence of the PE porous films 201, 204, 207 on the water-repellent sides, and the temperature gradient whereby the housing side is at high temperature and the air side is at low temperature due to the Peltier element 10, further inhibit movement of water vapor into the space 1a of the housing 1.

Thus, the water vapor in the space 1a of the housing 1 is discharged toward the air side when the atmosphere is dry, while the water vapor movement is slowed when the humidity of the space in the housing 1 is low and the humidity of the air 2 is higher, so that a low humidity is maintained in the housing.

Even if the Peltier element 10 is not operating, the water vapor will tend to move toward the air side, but it will be obvious that operating the Peltier element 10 will strongly accelerate movement of the water vapor to the air side.

Both the heating side and the cooling side of the Peltier element 10 are connected to the conductive porous body 9 through a polyethylene film, with good heat conduction and with electrical insulation maintained. Furthermore, the conductive porous body 9 is a copper mesh and the heat transfer distance of the mesh from the heat transfer end of the Peltier element 10 and the chamber 20 is approximately the same for uniform heating of the chamber wall and the conductive porous body 9, whereby the temperature of the chamber 20 is rapidly brought to an even temperature to reliably guarantee a temperature gradient between the chambers 20, 21 and 22 (see FIG. 13).

Figure 9:
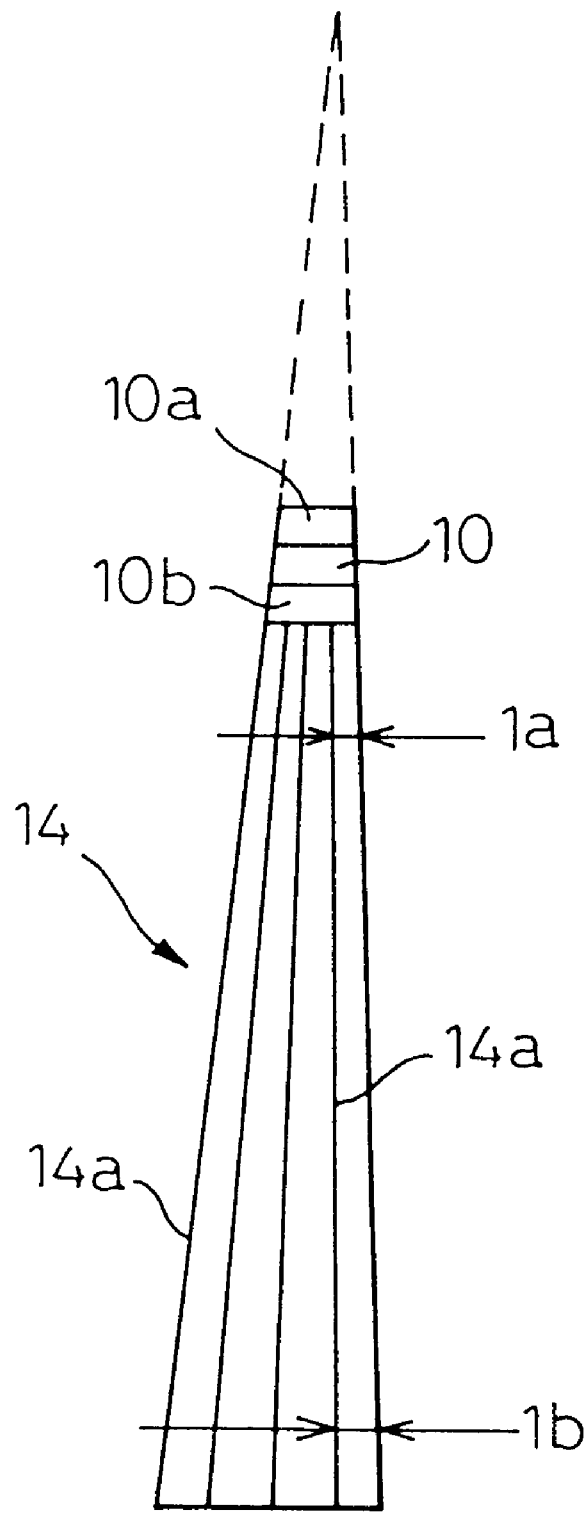
FIG. 9 is a front view showing the conical support frame of a moisture-permeable membrane according to an embodiment of the invention.

As shown in FIG. 9, the moisture-permeable membrane 5 itself is flexible and therefore it is held using a support frame 14 which is assembled as a conical cage with aluminum rods 14a. Similar to the moisture-permeable membrane 5, the support frame 14 is a good heat transfer body and allows the chamber to be evenly cooled. Notably, the upper and lower spaces 1a, 1b of the aluminum rods 14a differ because of the conical shape. This creates a temperature gradient in the contacting gas, thus accelerating convection in the chamber and promoting water vapor movement. This takes advantage of the fact that the "a" sections and "b" sections create a difference in the surface area for gases with specific volumes. The space 1a at the top end of the aluminum rods 14 a is about 10 mm.

Figure 8:
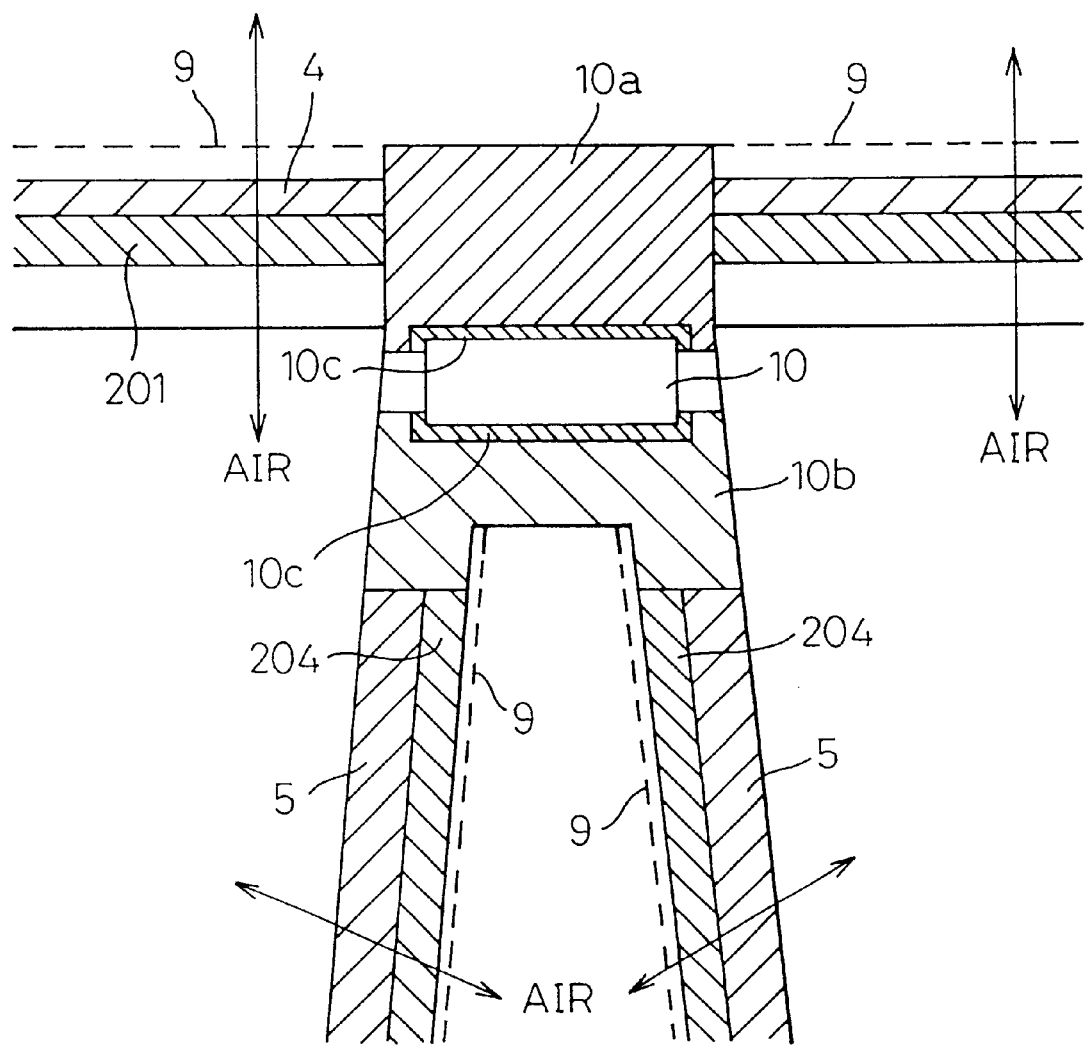
FIG. 8 is an illustration showing a Peltier element of the first moisture-permeable membrane of FIG. 2, in a mounted state.
Figure 13:
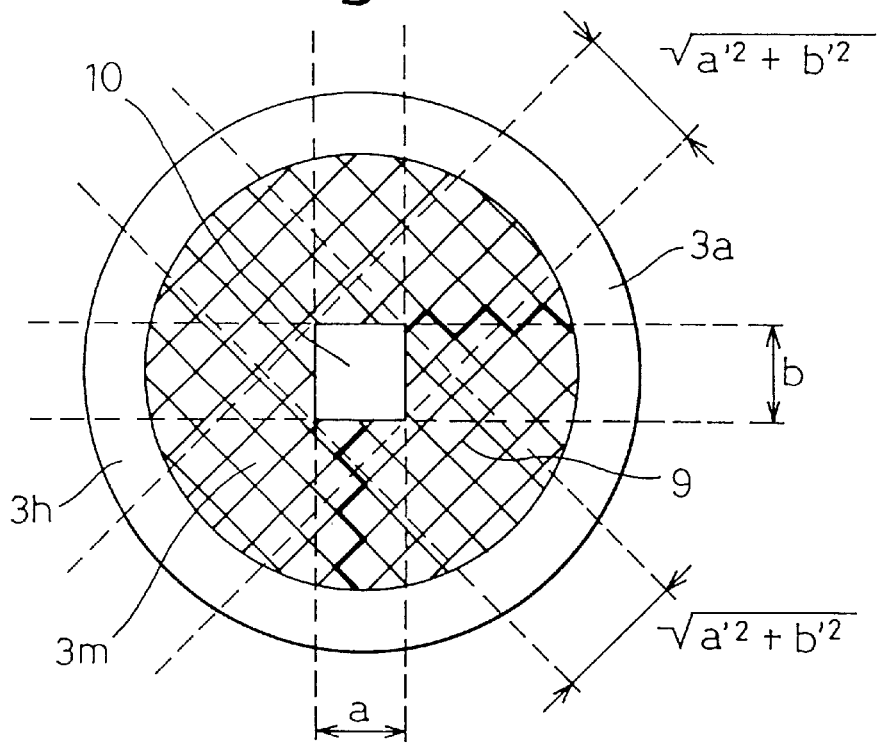
FIG. 13 is a sketch showing the conductive porous body and Peltier element of a first moisture-permeable membrane according to an embodiment of the invention.
Figure 14:
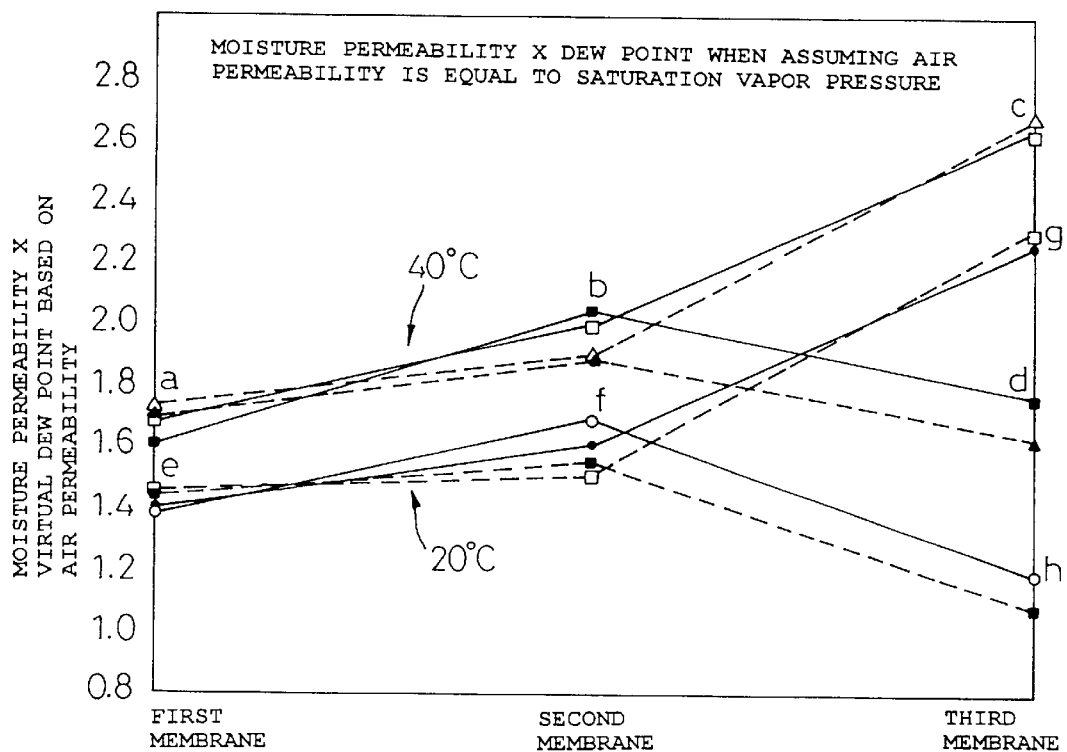
FIG. 14 is a graph showing the dew point conversions of the parameters (moisture permeability)×(air permeability) according to the invention.
Figure 15:
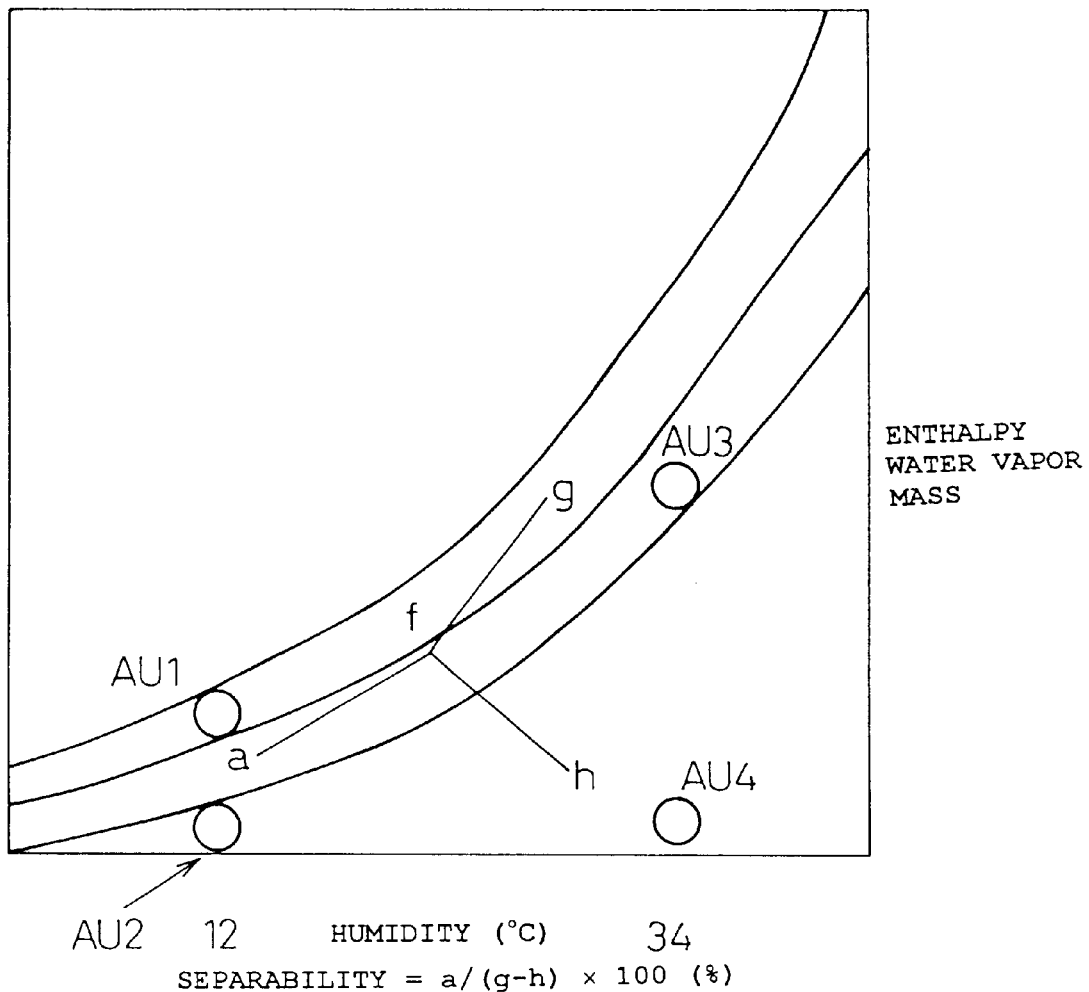
FIG. 15 is an operational diagram for an embodiment of the invention.
Figure 16:
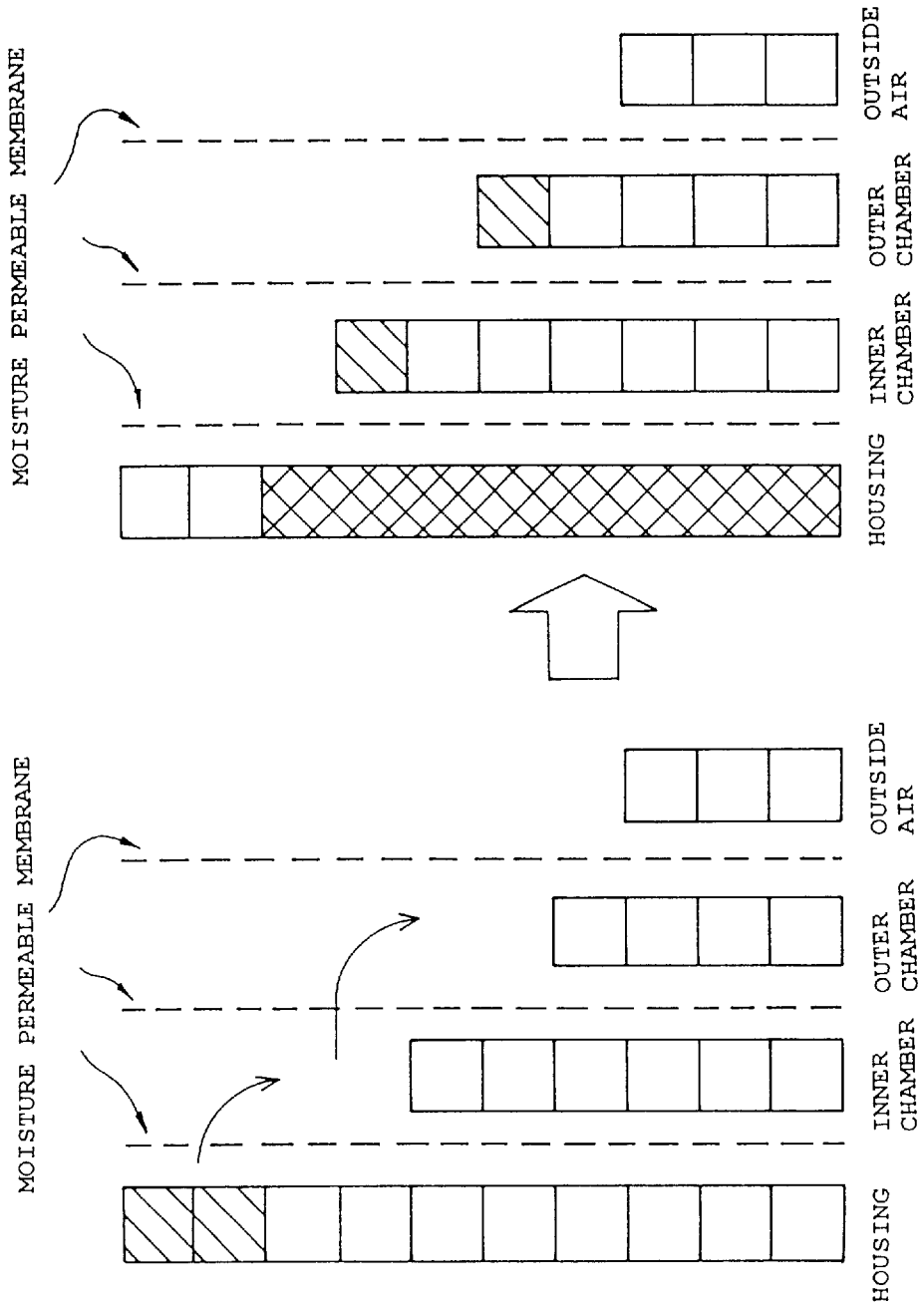
FIG. 16 is a model diagram showing water vapor movement due to the difference in values of the parameters (moisture permeability)×(air permeability) for moisture-permeable membranes according to an embodiment of the invention.
Figure 17:
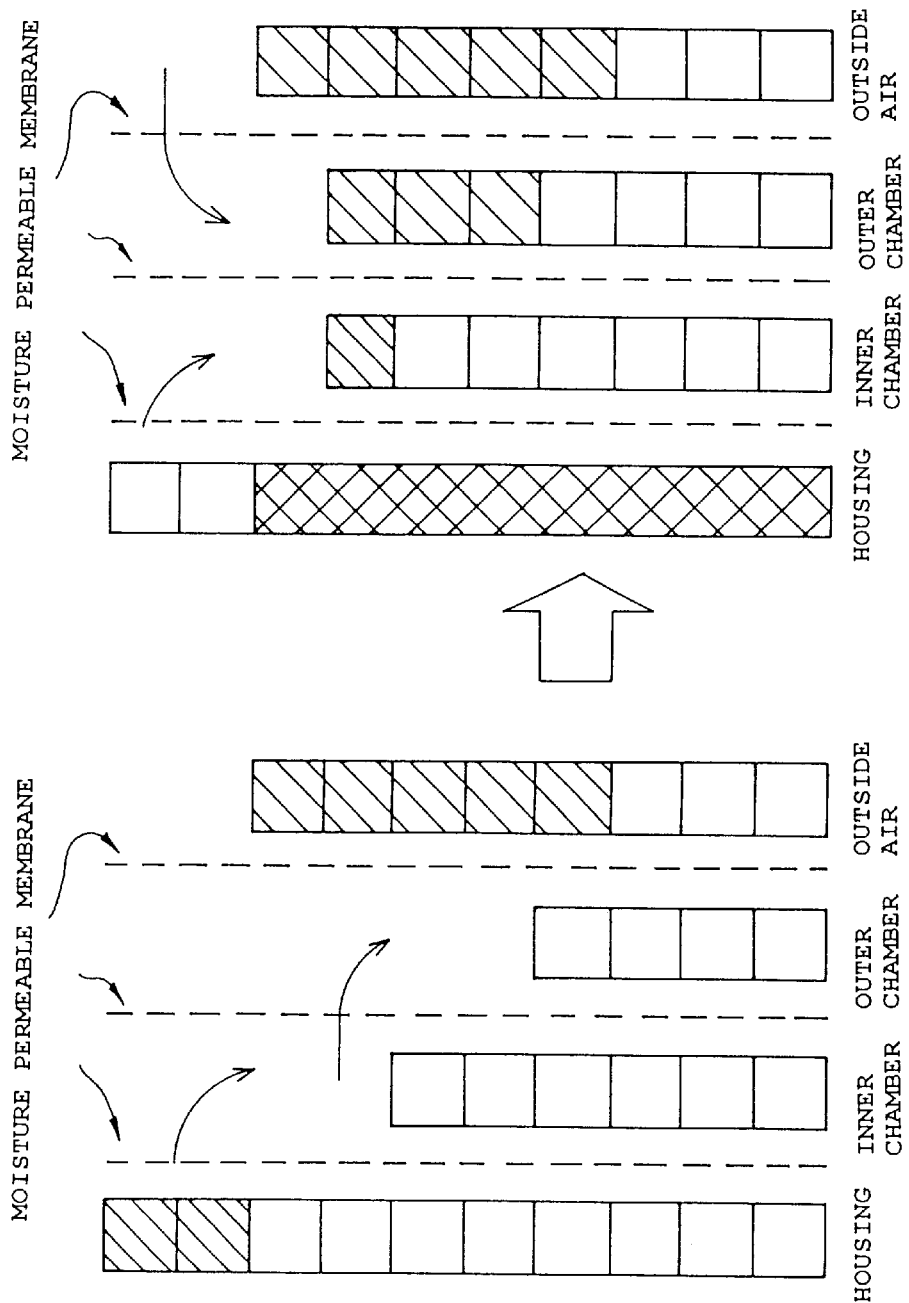
FIG. 17 is a model diagram showing migration to a state of equilibrium from the housing interior and outside air side, where the outside air side is lower than the housing, according to an embodiment of the invention.
Figure 18:
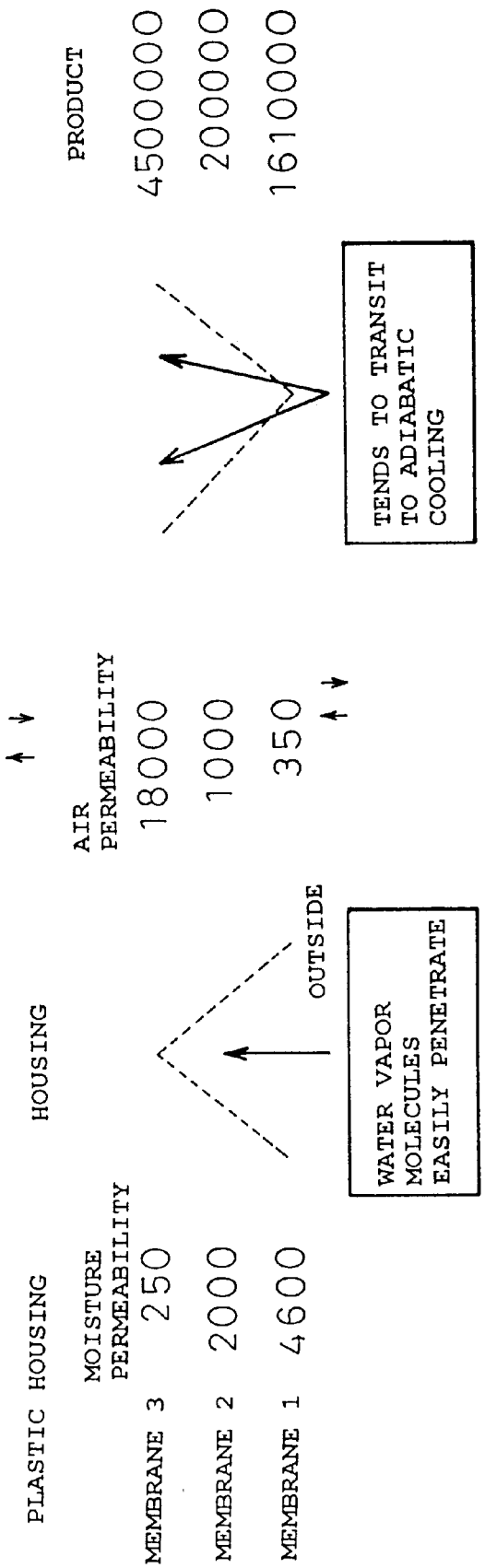
FIG. 18 is an illustration showing moisture permeability and air permeability of a moisture-permeable membrane, the parameter (moisture permeability)×(air permeability) and ease of water vapor penetration and adiabatic cooling trend, in a plastic housing.
Figure 19:
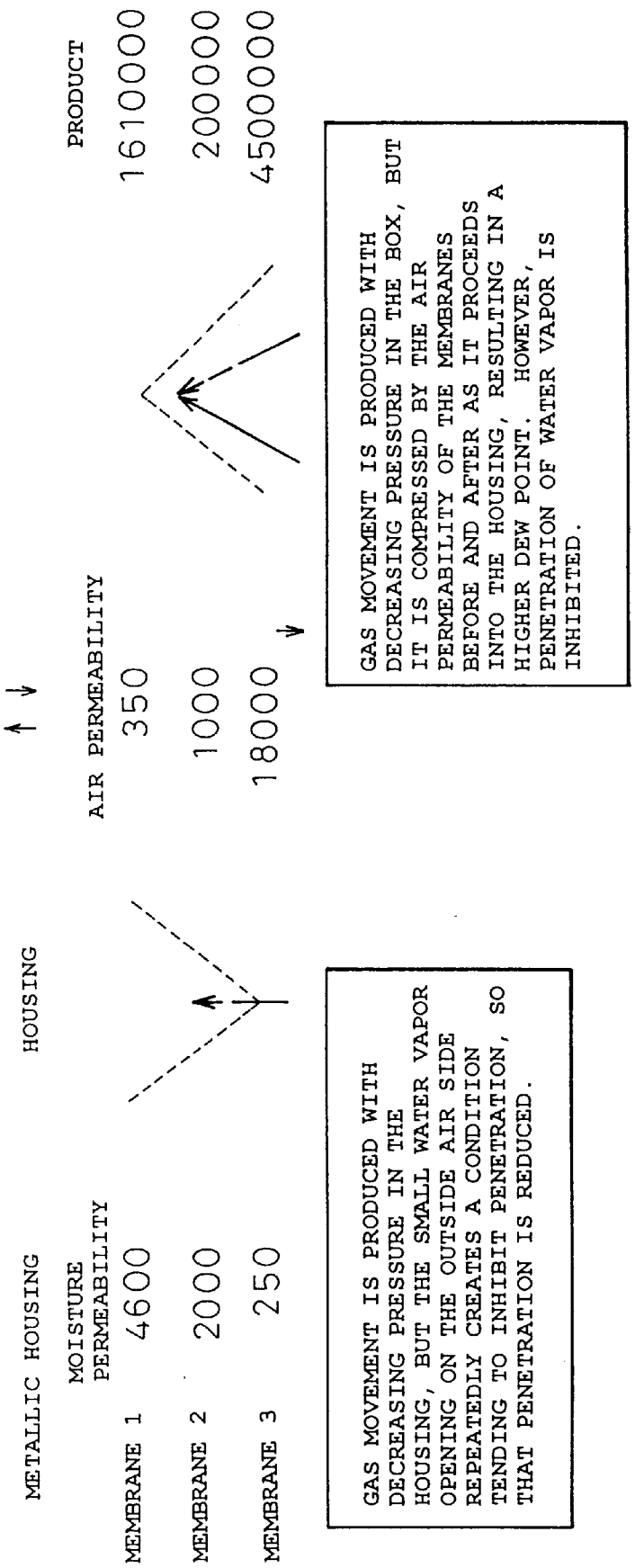
FIG. 19 is an illustration showing moisture permeability and air permeability of a moisture-permeable membrane, the parameter (moisture permeability)×(air permeability) and ease of water vapor penetration and adiabatic cooling trend, in a metal housing.
Figure 20:
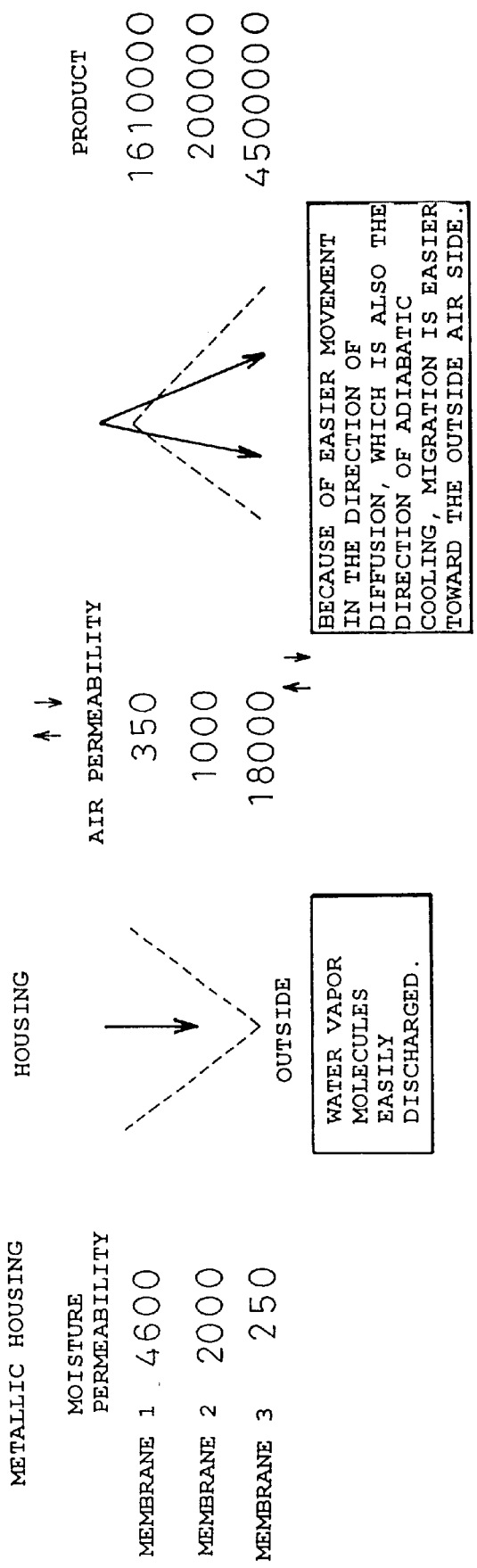
FIG. 20 is another illustration showing moisture permeability and air permeability of a moisture-permeable membrane, the parameter (moisture permeability)×(air permeability) and ease of water vapor penetration and adiabatic cooling trend, in a metal housing.

Specifically, the heating side of the Peltier element 10 heats the upper chamber through the heat transfer body 10a, and the cooling side of the Peltier element 10 cools the top of the approximately conical moisture-permeable membrane 5 which is inserted, through the aluminum roof 10b and the plurality of aluminum rods 14a provided at spacings of about 10 mm on the support frame 14 (see FIGS. 13, 9, 8 ). Consequently, the heat of the heating side of the Peltier element 10 moves toward the cooling side of the Peltier element 10 through the electrical insulating film 10c, the heat transfer body 10a, the conductive porous body 9 of the moisture-permeable membrane 4, the conductive porous body of the moisture-permeable membrane 6, the aluminum portion at the bottom of the moisture-permeable membrane 6, the element rods 14a, the conductive porous body of the moisture-permeable membrane 5, and the aluminum roof 10b. This heat movement creates a temperature gradient between the first moisture-permeable membrane 4 and the aluminum roof 10b of the second moisture-permeable membrane 5. This in turn creates a temperature gradient in the approximately conical space which facilitates water vapor movement by the moisture-permeable membranes 4, 5 and 6, which allows a more efficient temperature gradient to be produced by the Peltier element 10.

The embodiment shown in FIG. 28 is a case where the Peltier element is provided in the middle chamber. Here, 170 is a moisture-permeable membrane on the housing side, 171 is the moisture-permeable membrane 1, 172 is the moisture-permeable membrane 2, 173 is the moisture-permeable membrane 3, 175 is the chamber wall, 176 is the Peltier element, 177 and 178 are conductive porous bodies, 179 is a dust-proof or insect-proof net, 175$a$ is a drainer, 176$a$ is a solar battery to drive the Peltier element, 175$b$ is a gasket, and 175$c$ is a heat insulator or heat absorber. The Peltier element 176 of the embodiment shown in FIG. 28 heats the conductive porous body 177 on the inner side of the moisture-permeable membrane 171, and cools the conductive porous body 178 on the inner side of the moisture-permeable membrane 172 via a heat transfer body. This is a case where a temperature difference is provided in two approximately conical chambers on the inner and outer side. The rest of the construction and operation is the same as the previously explained embodiment.

FIGS. 29A, 29B and 29C show different cases where approximately conical spaces 270–277 are formed by moisture-permeable membranes 260–269, with Peltier elements 280, 281, 282 and adiabatic channels 290, 291, 292. FIG. 29A is a case where a large truncated conical space 270 and a conical space 271 are formed in a channel 290 by moisture-permeable membranes 260, 261, 262 and by moisture-permeable membranes 262, 261, and the Peltier element 280 is provided at the center of the moisture-permeable membrane 260 serving as the base of the space 270.

Figure 2:
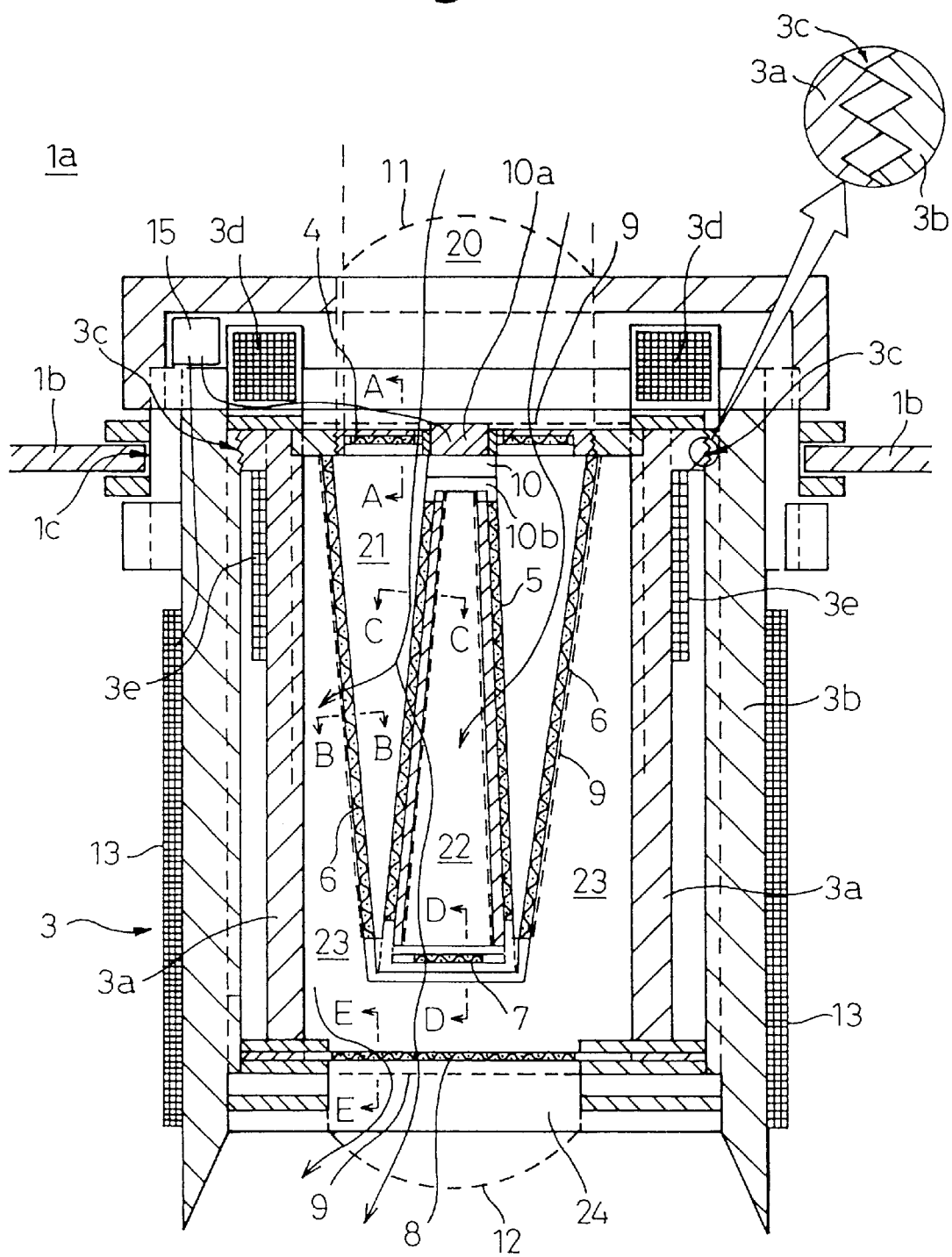
FIG. 2 is a longitudinal cross-sectional view of a water vapor movement control apparatus according to an embodiment of the invention.
Figure 3:
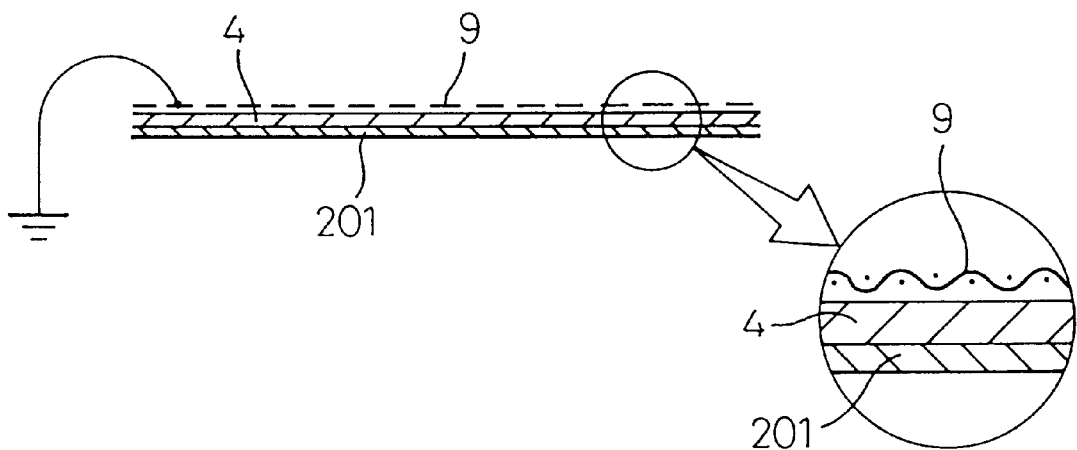
FIG. 3 is an enlarged cross-sectional view of FIG. 2 along A—A.
Figure 4:
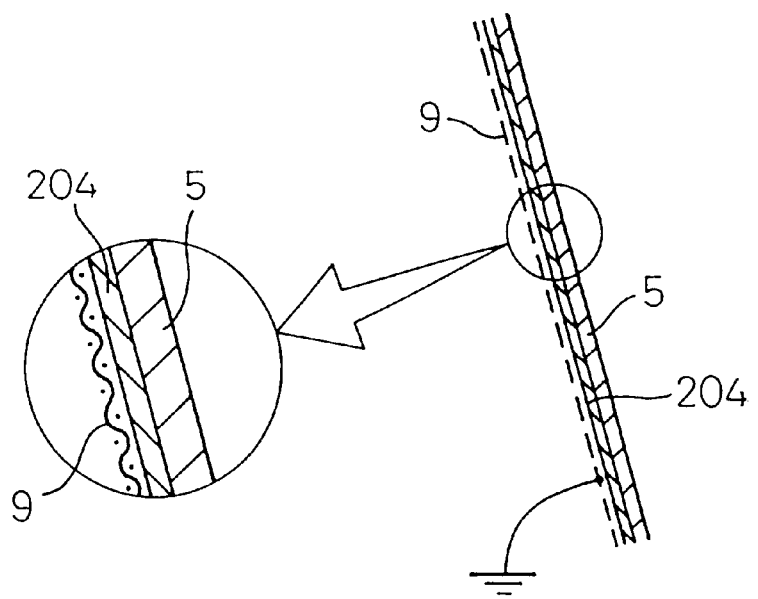
FIG. 4 is an enlarged cross-sectional view of FIG. 2 along B—B.
Figure 5:
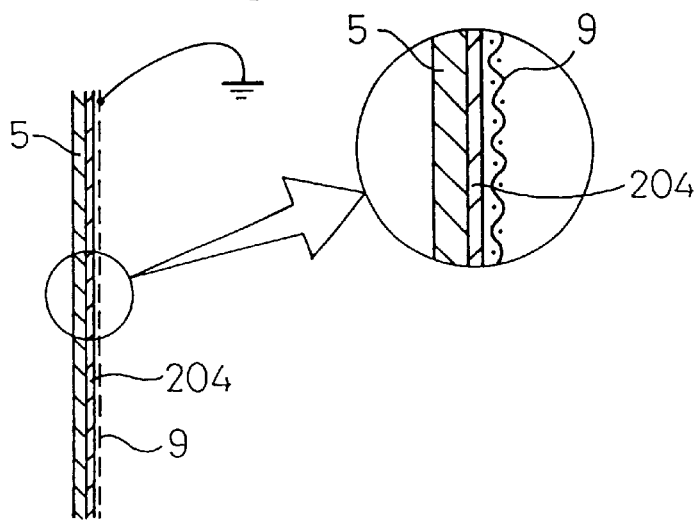
FIG. 5 is an enlarged cross-sectional view of FIG. 2 along C—C.
Figure 6:
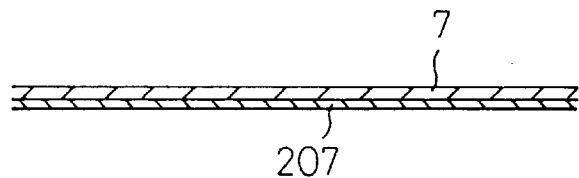
FIG. 6 is an enlarged cross-sectional view of FIG. 2 along D—D.
Figure 7:
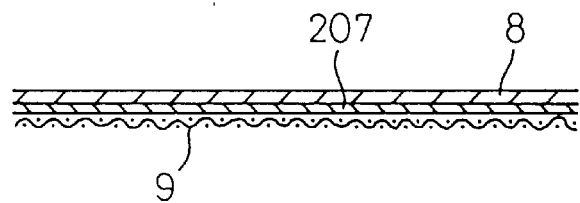
FIG. 7 is an enlarged cross-sectional view of FIG. 2 along E—E.

FIG. 29B is a case where the approximately conical spaces 272, 273 of FIG. 2 are formed, and a portion of the moisture-permeable membrane 264 is folded back and inserted into the space 272 formed thereby. FIG. 29C is a case where the moisture-permeable membrane 266$c$ is folded back three times to form a plurality of approximately conical spaces 274, 275, 276, 277, and the Peltier element 282 is, like in FIG. 29B, formed at the center of the horizontal moisture-permeable membrane 266 $a$ and joined at the top of the moisture-permeable membrane 266$a$.

Preferred embodiments of the invention have been explained above, but it will be appreciated that various modifications and improvements to the invention are possible, without limitation to those presented here.

The heat quantity of the heat absorber is set with the temperature gradient as the inclination of the degree of fluctuation rate, in consideration of heat release, the heat retention cavity volume, the total surface area of the apparatus, the contact area between the housing and the apparatus body support, the contact area between the apparatus body support and the chamber sections, etc. For downsizing of the apparatus, it is advantageous to stabilize the heat retention capacity of the heat retention cavity for the minimum necessary volume, and therefore an infrared reflective layer may be formed on the surface of the heat retention cavity.

By subjecting the chamber outer walls to treatment such as metal plating, printing, vapor deposition or the like, and also subjecting the inner walls of the heat retention cavity to such surface treatment, it is thereby possible to repeat the reflection by both, thus delaying heat conduction. This form also allows a vacuum mirror, such as a vacuum bottle, to be used as the heat retention cavity.

When a laminated sheet comprising copper, aluminum or the like (paper and copper, paper and aluminum, resin and metal foil, dielectric material and metal foil) or other type of sheet has been wound like a roll around the chamber wall or heat retention cavity wall or mounting section of the apparatus, as a heat absorber or heat transfer buffer device, as in the case where a time excess occurs until the heat is transferred from the outer perimeter of the roll to the inside, making it necessary to adjust the temperature rate transfer time between the inside chamber and the outside chamber, it is possible to prevent counterflow or to use it to compensate for time inefficiency up until the active movement time. Also, in cases where a metal foil with a high heat transfer rate is used and where a sheet with a low heat transfer rate is used, they may be set on the outside chamber and inside chamber, or they may be set on the outside air side and the housing side of the same chamber.

The sheets may also be triangular with the short sides contacting the chamber side or with the long sides contacting the chamber side, to thus allow active control of the heat transfer efficiency.

One feature of metal foils is their generally large heat expansion coefficient, such that the side contacting with the wound side readily produces a gap with increasing temperature.

In addition to this feature, heat transfer around the perimeter of the chamber can also accomplish even heat transfer against imbalances in heat on the housing side resulting from cooling phenomena caused by heat of evaporation due to, for example, direct sunlight rays, rain followed by wind, etc.

The average temperature or average calories on the sheet mounting section or the environment side which depend on the mounting environment, or the features of the location, may be printed allowing the installer to cut out and reassemble for freer adjustment of the heat transfer rate.

The construction of a heat absorber or heat insulating tank may be as follows.

Heat insulating tank—examples of structural elements Ag, Al, Cr, Ni, Ti, Au, Si, $CoO_3$, $Fe_2O_3$, $Cr_2O_3$, $TiO_2$, $SnO_2$, $In_2O_3$ (which can also provide an anti-reflection effect), as the actual substances or for surface treatment Ceramic porous body (with large response characteristic delay)

Asbestos, mica, glass fiber, paper, rice paper Air

Styrol foam (not for use in cold or hot climates) and other porous materials

Low-melting-point gas liquefaction tank (nitrogen tank) (donut-shaped or a tank set in the channel)

Water tank Water vapor gas low-pressure tank

Cooling tank—examples of structural elements

Aluminum or copper helical plate

Aluminum mass (alumina-treated) When it is desired to increase the absorption properties of the alumina-treated mass as the chamber material, Au, Ag, Cu, NiZnS/Ni, Al, $SuO_2$, $In_2O_3$ (which can also provide a reflection effect) may be used as the surface treatment material or the actual substance.

Low-melting-point gas liquefaction tank (nitrogen tank) (donut-shaped or a tank set in the channel) contacting with heat sink fin Thermal paint may be applied onto the lowermost or uppermost mesh, or on the surface of the moisture-permeable membranes, at a location which is easily visible from outside of the outer cylinder, so that changes in the color thereof can clearly indicate when replacement is necessary. According to this method, by applying thermal paint from the bottom of high locations, or on the top or around the entire outer perimeter of the apparatus in locations near the ground or living spaces, it is possible to indicate when replacements are necessary if specific conspicuous colors (red, blue or yellow) can be clearly seen (in such a manner that the company logo stands out, or that letters indicating the need for replacement stand out).

The thermal paint is used as a sheet-like thermometer, and this treatment may also be carried out particularly on the visible parts of the moisture-permeable membranes to utilize the property of the tendency toward cooling when the temperature fluctuation of the moisture-permeable membrane becomes impractical due to clogging and the like. In other words, because clogging reduces the pore efficiency of the moisture-permeable membrane surface, the compression causing increased fluctuation of evaporation heat can be detected so that the color change is easier to see.

According to the invention, as explained above, moisture-permeable membranes are arranged according to their values for (moisture permeability)×(air permeability) in the direction in which water vapor is to be moved, while bottom sides of the moisture-permeable membranes are water-repellent surfaces and a conductive porous body and Peltier element are used to provide a temperature gradient, with each chamber formed into an approximately conical shape with the moisture-permeable membranes, thus reinforcing the directional property of movement of water vapor; it is thereby possible to accomplish dehumidification, drying or humidification with very low power. There are no movable parts and the apparatus is small and can be inexpensively fabricated, while running costs can also be greatly reduced.

What is claimed is:

1. A water vapor movement control apparatus that moves water vapor from a first space that contains water vapor in the air to a second space that is separate from the first space, the water vapor movement control apparatus being provided with an insulated channel connecting said first space with said second space into which the water vapor of said first space is to be moved, a plurality of moisture-permeable membranes which are waterproof and air-permeable provided inside said channel, a plurality of chambers formed in the channel by said moisture-permeable membranes, a Peltier element that creates a temperature gradient so that the air in said chambers is always at lower temperature toward the second space end, and grounded conductive porous bodies situated proximally adjacent to the moisture-permeable membranes of the chambers which are heated and cooled by said Peltier element, wherein each of said moisture-permeable membranes has a water-repellent side and is situated inside said channel with the water-repellent side facing the second space, a middle moisture-permeable membrane among said plurality of moisture-permeable membranes forms an approximately conical shape, said plurality of chambers include at least one chamber with an approximately conical space enclosed by an approximately conical moisture-permeable membrane, small approximately conical moisture-permeable membranes are inserted in opposite directions in the approximately conical chamber spaces formed by the approximately conical moisture-permeable membranes, to form a ring of a plurality of approximately conical chambers, said Peltier element is provided in the center of the moisture-permeable membrane serving as the base of the approximate cone, and the approximately conical top in which said Peltier element is inserted in the center of the moisture-permeable membrane is cooled and heated, the heated side or cooled side of said Peltier element is thermally connected with said conductive porous bodies via a heat transfer body, and the parameter (moisture permeability)×(air permeability) of each of said plurality of moisture-permeable membranes decreases for the moisture-permeable membranes toward the second space end, so that water vapor in the first space is moved into the second space.

2. A water vapor movement control apparatus according to claim 1 for dehumidification of a machine housing, wherein said first space is the space in a housing situated in the outdoor air and said second space is the air, so that water vapor is eliminated from the machine housing into the air.

3. A water vapor movement control apparatus according to claim 1, wherein said first space is the air and said second space is the space in a housing situated in the air, so that water vapor in the air is moved into the housing space.

4. A water vapor movement control apparatus that moves water vapor from a first space that contains water vapor in the air and is enclosed by a metal housing wherein said air has a large temperature fluctuation rate, to a second space that is separate from the first space and whose air has a small temperature fluctuation rate, the water vapor movement control apparatus being provided with an insulated channel connecting said first space with said second space into which the water vapor of said first space is to be moved, a plurality of moisture-permeable membranes which are waterproof and air-permeable provided inside said channel, a plurality of chambers formed in the channel by said moisture-permeable membranes, a Peltier element that creates a temperature gradient so that the air in said chambers is always at lower temperature toward the second space end, and grounded conductive porous bodies situated proximally adjacent to the moisture-permeable membranes of the chambers which are heated and cooled by said Peltier element, wherein each of said moisture-permeable membranes has a water-repellent side and is situated inside said channel with the water-repellent side facing the second space, a middle moisture-permeable membrane among said plurality of moisture-permeable membranes forms an approximately conical shape, said plurality of chambers include at least one chamber with an approximately conical space enclosed by an approximately conical moisture-permeable membrane, small approximately conical moisture-permeable membranes are inserted in opposite directions in the approximately conical chamber spaces formed by the approximately conical moisture-permeable membranes, to form a ring of a plurality of approximately conical chambers, said Peltier element is provided in the center of the moisture-permeable membrane serving as the base of the approximate cone, and the approximately conical top in which said Peltier element is inserted in the center of the moisture-permeable membrane is cooled and heated, the heated side or cooled side of said Peltier element is thermally connected with said conductive porous bodies via a heat transfer body, and the parameter (moisture permeability)×(air permeability) of each of said plurality of moisture-permeable membranes increases for the moisture-permeable membranes toward the second space end, so that water vapor in the first space is moved into the second space.

5. A water vapor movement control apparatus according to claim 4 for dehumidification of a machine housing, wherein said first space is the space in a housing situated in the outdoor air and said second space is the air, so that water vapor is eliminated from the machine housing into the air.

6. A water vapor movement control apparatus that moves water vapor to a first space that contains water vapor in the air and is enclosed by a metal housing wherein said air has a large temperature fluctuation rate, from a second space that is separate from the first space and whose air has a small temperature fluctuation rate, the water vapor movement control apparatus being provided with an insulated channel connecting said first space with the second space which is the source of water vapor into said first space, a plurality of moisture-permeable membranes which are waterproof and air-permeable provided inside said channel, a plurality of chambers formed in the channel by said moisture-permeable membranes, a Peltier element that creates a temperature gradient so that the air in said chambers is always at lower temperature toward the first space end, and grounded conductive porous bodies situated proximally adjacent to the moisture-permeable membranes of the chambers which are heated and cooled by said Peltier element, wherein each of said moisture-permeable membranes has a water-repellent side and is situated inside said channel with the water-repellent side facing the second space, a middle moisture-permeable membrane among said plurality of moisture-permeable membranes forms an approximately conical shape, said plurality of chambers include at least one chamber with an approximately conical space enclosed by an approximately conical moisture-permeable membrane, small approximately conical moisture-permeable membranes are inserted in opposite directions in the approximately conical chamber spaces formed by the approximately conical moisture-permeable membranes, to form a ring of a plurality of approximately conical chambers, said Peltier element is provided in the center of the moisture-permeable membrane serving as the base of the approximate cone, and the approximately conical top in which said Peltier element is inserted in the center of the moisture-permeable membrane is cooled and heated, the heated side or cooled side of said Peltier element is thermally connected with said conductive porous bodies via a heat transfer body, and the parameter (moisture permeability)×(air permeability) of each of said plurality of moisture-permeable membranes decreases for the moisture-permeable membranes toward the second space end, so that water vapor in the second space is moved into the first space.

* * * * *